US011259467B1

United States Patent
Pramod

(10) Patent No.: US 11,259,467 B1
(45) Date of Patent: *Mar. 1, 2022

(54) CONTINUOUS BALER

(71) Applicant: Redlands Ashlyn Motors, PLC, Tamil Nadu (IN)

(72) Inventor: Perinchery Narayanankutty Pramod, Thissur (IN)

(*) Notice: Subject to any disclaimer, the term of this patent is extended or adjusted under 35 U.S.C. 154(b) by 0 days.

This patent is subject to a terminal disclaimer.

(21) Appl. No.: 16/747,187

(22) Filed: Jan. 20, 2020

Related U.S. Application Data

(63) Continuation-in-part of application No. 16/140,761, filed on Sep. 25, 2018, now Pat. No. 10,537,066.

(51) Int. Cl.
*A01F 15/07* (2006.01)
*A01F 15/14* (2006.01)

(52) U.S. Cl.
CPC ........ *A01F 15/0705* (2013.01); *A01F 15/141* (2013.01)

(58) Field of Classification Search
CPC ...... A01F 15/141; A01F 15/07; A01F 15/071; A01F 15/0705; A01F 15/0883; A01F 15/0833; A01F 15/106; A01F 2015/074; A01D 39/00; A01D 39/005; A01D 43/006
USPC ........................................ 100/87, 88; 56/341
See application file for complete search history.

(56) References Cited

U.S. PATENT DOCUMENTS

| | | | | |
|---|---|---|---|---|
| 4,022,003 A * | 5/1977 | Strausser | ............ | A01F 15/0705 56/341 |
| 4,167,844 A * | 9/1979 | Freimuth | ............... | A01F 15/141 100/5 |
| 10,537,066 B1 * | 1/2020 | Pramod | ................. | A01F 15/141 |
| 2008/0264031 A1 * | 10/2008 | McHale | ............... | A01F 15/071 56/341 |
| 2014/0165856 A1 * | 6/2014 | Varley | ................. | A01F 15/0833 100/40 |
| 2015/0128551 A1 * | 5/2015 | Reijersen Van Buuren | ................ | A01F 15/071 56/341 |
| 2017/0006779 A1 * | 1/2017 | Keune | ................. | A01F 15/0705 |
| 2018/0027741 A1 * | 2/2018 | Varley | ................. | A01F 15/0833 |

* cited by examiner

*Primary Examiner* — Jimmy T Nguyen
(74) *Attorney, Agent, or Firm* — Michael D. Eisenberg

(57) ABSTRACT

A continuous baler having a movable section having an open mode and a closed mode. In the closed mode, the movable section is joined to a baling half chamber and a tying half chamber to form a baling chamber and a tying chamber, respectively. In the open mode, the movable section is moved away from the baling half chamber and tying half chamber, in order to allow passage of a bale formed in the baling chamber from the baling half chamber to the tying half chamber.

20 Claims, 22 Drawing Sheets

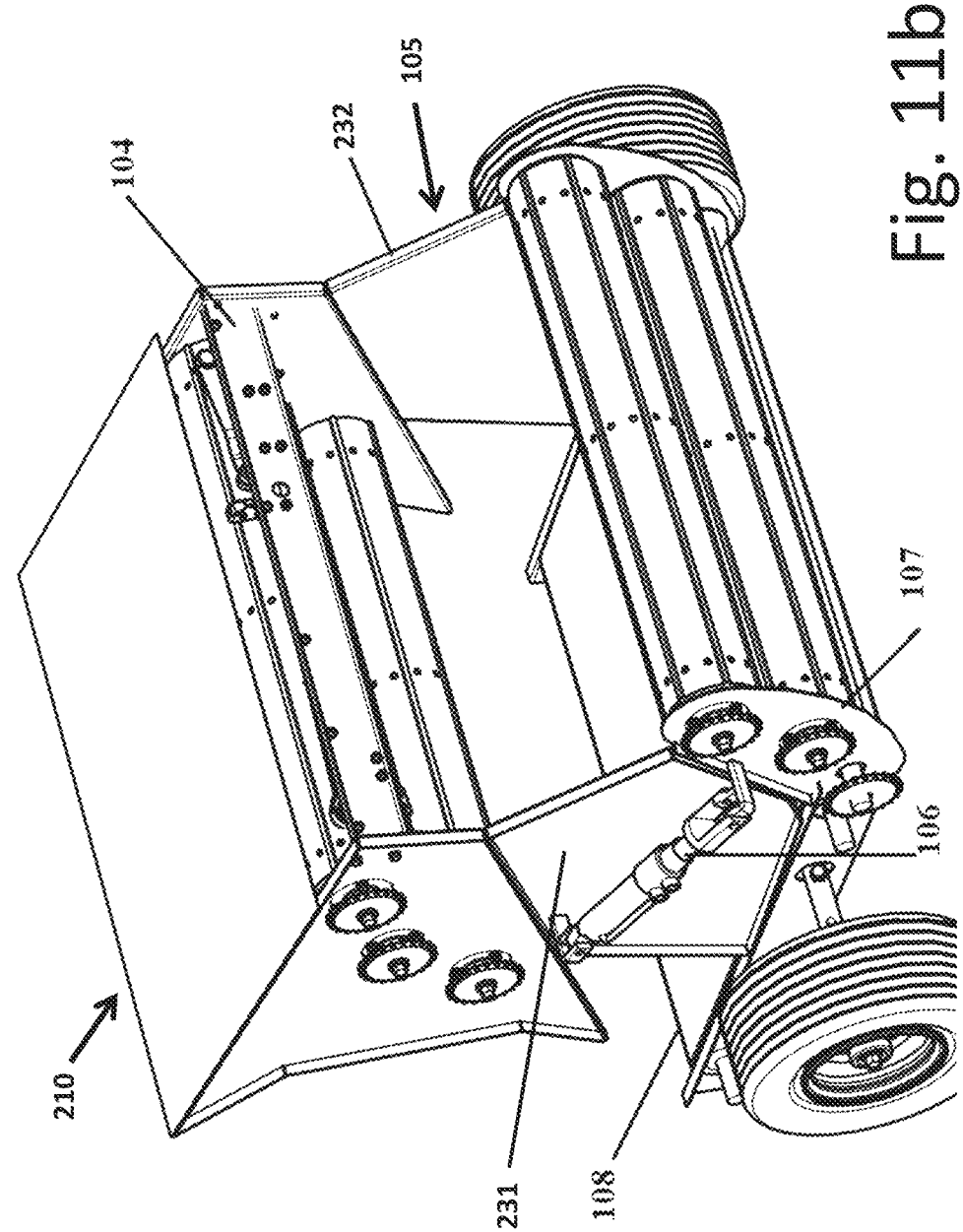

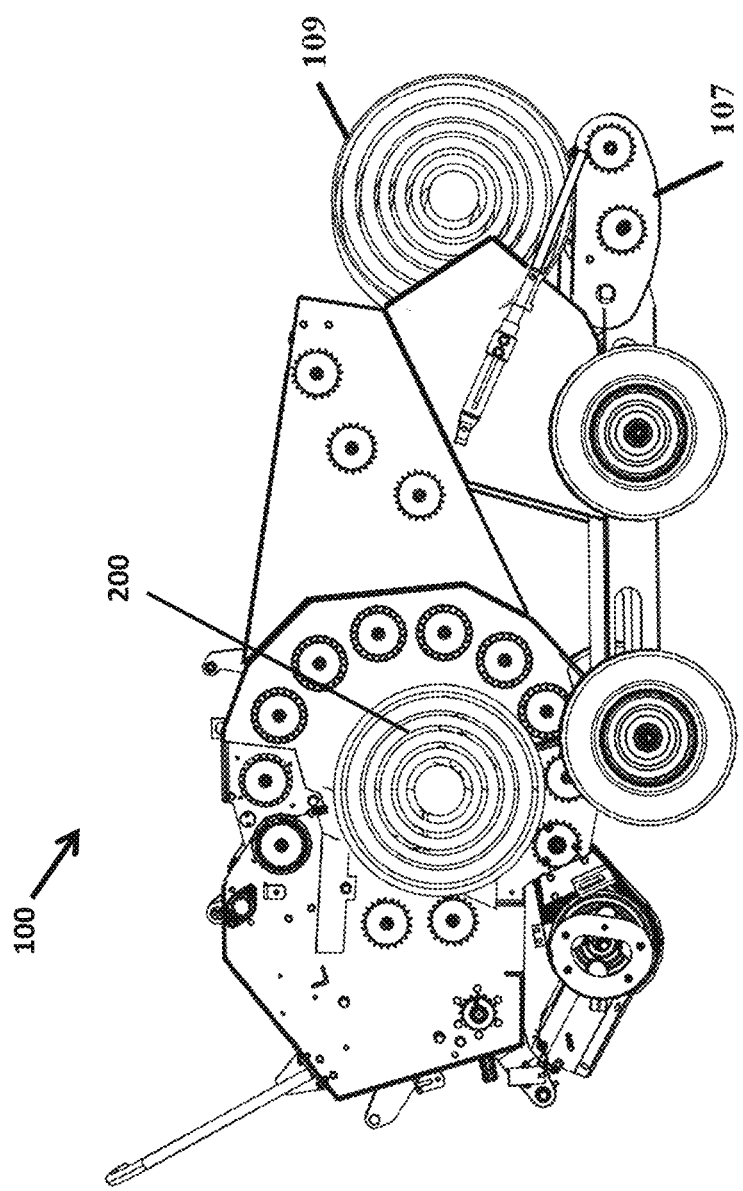

CONTINUOUS BALER

CROSS-REFERENCES TO RELATED APPLICATIONS

This application is a continuation-in-part (CIP) of U.S. patent application Ser. No. 16/140,761 filed Sep. 25, 2018, which is hereby incorporated herein by reference in its entirety.

FIELD OF TECHNOLOGY

The present invention, in some embodiments thereof, relates to farming machinery and more particularly to machinery designed for collecting crop to produce cylindrical bales.

BACKGROUND

Balers are farming machines configured for collecting crop and produce cylindrical bales. Many balers are powered by tractors or self-propelled. Conventional round balers pick up crop and compress the crop into compacted bales in a bale forming chamber. There are generally three major steps in the operation of a round baler: bale-forming, tying, and ejecting.

A crop pickup unit picks up material lying on the ground and feeds it to the bale forming chamber of the baler to form a bale. Once the bale of desired density is fully formed, the vehicle may stop and a tying cycle may begin. With the forward motion of the baler stopped, mesh, twine or film is wrapped around the bale using an automated mechanism associated with the bale chamber. Once tying or wrapping is complete, ejecting may begin in which the bale chamber is opened, typically by lifting a tailgate, and the wrapped bale falls or is pushed out of the bale chamber. After ejection, bale-forming is restarted for a new bale and the operator feeds the crop to the baler and moves the baler through the field.

Continuous balers are balers that can produce ad eject a bale while picking up crop for the next bale. In this manner, continuous balers are not required to stop. Current continuous round balers are complicated in construction, include many moving parts, and therefore a major cause of reliability issues. Such systems may have two baling chambers, one located above the other, a feature which may pose challenges for baling dry crops and straw. This is because, the adhesion of dry crop to a unit which collects and guides the crop is minimal. Thus, the collected dry crop tends to accumulate and clogs at the entry of the baling chambers.

Another form of continuous balers uses endless belts inside baling chambers, which are complicated in construction. In such endless belts, initially the crop is fed to a belt, the slackness of which is gradually increased to forms a cylindrical cavity to produce round bale. After a predetermined quantity of crop has been fed to the baler, the belt rolls over the bale and the belt is now ready for next bale. This process requires many adjustments in the tension of the belt and therefore requires complicated sensors and linear actuators or hydraulic cylinders.

European Patent EP 3058806 discloses a round baler for forming a bale from a crop product. The round baler comprises a first bale forming chamber provided with a first bale forming mechanism, a second bale forming chamber provided with a second bale forming mechanism, a working unit, comprising a rotor rotatable around a rotor axis of a feeding mechanism, a transfer unit, and a density control mechanism, configured to detect a density of a preformed bale in the first bale forming chamber, wherein one or more sections of the first bale forming chamber provide for one or more control elements of the density control mechanism.

U.S. Pat. No. 9,253,948 discloses a continuous round baler system that has a baler and an accumulating system. The accumulating system includes a conveyor configured to convey crop material extending from a pickup mechanism to a bale formation chamber in the baler. A screed is positioned adjacent the end of the conveyor and is configured to be movable by a lifting mechanism between a raised position and a lowered position relative to the first conveyor. In the raised position, a gap is formed between the screed and the first conveyor so that crop material passes into the bale formation chamber. In the lowered position, the gap is closed thereby preventing the crop material from passing to the baler causing the crop material to remain on the conveyor.

U.S. Pat. No. 6,467,237 discloses a large round baler, designed as a non-stop baler, which includes a mobile chassis supporting a lower baling chamber section, defined by a floor conveyor arrangement, and an upper baling chamber section. The upper baling chamber section, together with opposite side walls, is mounted for fore-and-aft movement relative to the lower baling chamber section between a rear location, wherein it cooperates with the floor conveyor arrangement to define a rear baling chamber, and a front location wherein it cooperates with the floor conveyor arrangement to define a front baling chamber. The upper chamber section includes front and rear wall portions which are mounted for being raised once a bale is formed in the rear baling chamber so that the upper section may be moved to its forward location. A wrapping device is provided which is operable once the upper chamber section is moved to its front location, for wrapping the bale with overlapping wraps of sheeting made from plastic or the like so as to provide an air tight casing for the crop material so as to make silage.

BRIEF SUMMARY OF THE INVENTION

An aspect of some embodiments of the present invention relates to continuous baler for forming bales of crop. The baler includes a collection unit, a baling half chamber, a movable section, a tying half chamber, and a binding unit. The collection unit is located at a front end of the baler and is configured for collecting the crop from a ground on which the continuous baler travels. The baling half chamber is located behind the collection unit and is configured to receive the crop from the collection unit and comprising two first walls and a plurality of first horizontal rollers parallel to each other and disposed between the two first walls along a first arcuate path along a vertical plane. The movable section is located aft of the baling half chamber and includes a front half chamber on a front side of the movable section and a rear half chamber on a rear side thereof. The front half chamber includes two second walls and a plurality of second horizontal rollers parallel to each other and to the first horizontal rollers and disposed between the two second walls along a second arcuate path along a vertical plane. The rear half chamber includes two third walls and a plurality of third horizontal rollers parallel to each other and disposed between the two third walls along a third arcuate path along a vertical plane. The tying half chamber located behind the movable section and includes two fourth walls and a gate. The two fourth walls which are opposing side walls of the tying chamber. The gate located is behind the fourth walls and is substantially perpendicular to the fourth walls. The gate includes a plurality of fourth horizontal rollers parallel to each other and to the third horizontal rollers and disposed along a fourth arcuate vertical path. The gate is hinged to a rear section of a floor of the tying half chamber. The binding unit is located in the rear half chamber or in the tying half chamber. The movable section is movable between an open mode and a closed mode thereof. In the closed mode of the movable section, the baling half chamber and the front half chamber of the movable section are joined to form a substantially cylindrical baling chamber in which the first arcuate path of the first rollers and the second arcuate path of the second rollers form together a first circular path. The baling chamber is configured to rotate the crop received from the collection unit inside the cylindrical baling chamber in order to form a cylindrical bale. In the open mode of the movable section, the front half chamber is moved away from the baling half chamber, thereby opening the baling chamber and enabling passage of the bale into the tying half chamber. In the closed mode of the movable section, the tying half chamber and the rear half chamber of the movable section are joined to form a tying chamber in which the third arcuate path of the third rollers and the fourth arcuate path of the fourth rollers are opposite sides of a second circular path, when the gate is closed. The tying chamber is configured to cause the bale to rotate about the bale's cylindrical axis while activating the binding unit to bind the bale. The gate is configured for opening by rotating about a first hinge thereof to release the bale out of the baler, after the bale is bound.

In a variant, the second rollers are parallel to the third rollers.

In another variant, the collection unit is joined to the baling half chamber via a second hinge and is configured to rotated around the second hinge for being selectively lowered to the ground and raised from the ground.

In yet another variant, the first walls are parallel to each other.

In a further variant, the second walls are parallel to each other.

In yet another variant, the third walls are parallel to each other.

In a variant, the fourth walls are parallel to each other.

In yet variant, the movable section is joined to a top of the baling half chamber via a third hinge and is configured to move between the closed mode and the open mode by rotating about the third hinge.

In yet another variant, the movable section is joined to a top of the tying half chamber via a fourth hinge and is configured to move between the closed mode and the open mode by rotating about the fourth hinge.

In a further variant, the continuous baler further includes an elevator, wherein the movable section is joined to the elevator, such that the elevator is configured for raising the movable section to the open mode and for lowering the movable section to the closed mode.

In yet a further variant, the continuous baler comprises a conveyor located between the baling half chamber and the tying half chamber, the conveyor being configured to carry the bale from the baling half chamber to the tying half chamber.

Optionally, a rear section of the conveyor is the floor of the tying half chamber.

In a variant, the continuous baler includes a pressure sensor associated with at least one of the first rollers and/or at least one of the second rollers, and a first actuator configured for moving the movable section. The pressure sensor is configured for sensing a pressure exerted by the bale on the at least one of the first rollers and/or at least one of the second rollers when the movable section is in the closed mode, and for causing the first actuator to move the movable section to the open mode when the pressure reaches a predetermined pressure.

In another variant, the first circular path is larger than the second circular path, such that a closing of the movable section on the bale when the bale is in the tying the chamber is configured to compress the bale in the tying chamber.

In yet another variant, the continuous baler further includes a second actuator and a sensing unit associated with the binding mechanism, wherein the sensing unit is configured for detecting an end of a binding of the bale inside the tying chamber and for causing the gate to open in order to eject the bale out of the baler.

In a further variant, the continuous baler further includes a second actuator and a proximity sensor associated with the tying chamber, wherein the presence proximity sensor is configured for sensing a presence of the bale in the tying chamber and on the gate while the gate is open and for causing the second actuator to close the gate if the presence of the bale is sense neither in the tying chamber nor on the gate.

Another aspect of some embodiments of the present invention relates to a method for forming crop bales, the method comprising: providing a baler; forming a baling chamber in the baler by joining a front half chamber of a movable section to a fixed half baling chamber; continuously collecting crop from a front side and leading the crop to a baling half chamber; rolling the crop to form a bale in the baling chamber; once the bale reaches a desired size and density, opening the baling chamber, by moving the movable section away from the baling half chamber; leading the bale to a fixed tying half chamber; forming a tying chamber by closing the movable section in order to join a rear half chamber of the movable section to the fixed tying half chamber; binding the bale in the tying chamber; once the bale is bound, opening a gate at a rear side of the baler; leading the bale out of the baler via the gate; once the bale is out of the baler, closing the gate.

In a variant, the forming of the tying chamber comprises simultaneously forming the baling chamber. The binding of the bale in the tying chamber comprises simultaneously forming a second bale in the baling chamber. The method comprises, after the closing of the gate, opening the baling chamber and leading the second bale to the tying half chamber.

In another variant, the forming of the tying chamber comprises compressing the bale in the tying chamber.

Another aspect of some embodiments of the present invention relates to a continuous baler for forming bales of crop. The baler includes a collection unit, a baling half chamber, a movable section, a tying half chamber, and a tying unit. The collection unit is located at a front end of the baler and is configured for collecting the crop from a ground on which the continuous baler travels. The baling half chamber is located behind the collection unit and is configured to receive the crop from the collection unit. The baling half chamber includes two first walls and a plurality of first horizontal rollers parallel to each other and disposed between the two first walls along a first arcuate path along a vertical plane. The movable section is located aft of the baling half chamber and includes a front half chamber on a front side of the movable section and a rear half chamber on a rear side thereof. The front half chamber includes two second walls and a plurality of second horizontal rollers parallel to each other and to the first horizontal rollers and disposed between the two second walls along a second arcuate path along a vertical plane. The rear half chamber includes two third walls and a plurality of third horizontal rollers parallel to each other and disposed between the two third walls along a third arcuate path along a vertical plane. The tying half chamber is located behind the movable section and includes two fourth walls and a gate. The two fourth walls are opposing side walls of the tying chamber. The gate is located behind the fourth walls and includes two fifth walls and a plurality of fourth horizontal rollers parallel to each other and to the third horizontal roller. The fourth horizontal rollers are disposed along a fourth arcuate vertical path between the two fifth walls. The gate is hinged via a first hinge to a top section of each of the fourth walls. The binding unit is located in the rear half chamber or in the tying half chamber. The movable section is movable between an open mode and a closed mode thereof. In the closed mode of the movable section, the baling half chamber and the front half chamber of the movable section are joined to form a substantially cylindrical baling chamber in which the first arcuate path of the first rollers and the second arcuate path of the second rollers form together a first circular path. The baling chamber is configured to rotate the crop received from the collection unit inside the cylindrical baling chamber in order to form a cylindrical bale. In the open mode of the movable section, the front half chamber is moved away from the baling half chamber, thereby opening the baling chamber and enabling passage of the bale into the tying half chamber. In the closed mode of the movable section, the tying half chamber and the rear half chamber of the movable section are joined to form a tying chamber in which the third arcuate path of the third rollers and the fourth arcuate path of the fourth rollers form a second circular path, when the gate is closed. The tying chamber is configured to cause the bale to rotate about the bale's cylindrical axis while activating the binding unit to bind the bale. The gate is configured for opening by swinging about the first hinge thereof to release the bale out of the baler, after the bale is bound.

In a variant, the second rollers are parallel to the third rollers.

In another variant, the collection unit is joined to the baling half chamber via a second hinge, and is configured to rotate around the second hinge for being selectively lowered to the ground and raised from the ground.

In yet another variant, the first walls are parallel to each other.

In a further variant, the second walls are parallel to each other.

In yet a further variant, the third walls are parallel to each other.

In a variant, the fourth walls are parallel to each other.

In another variant, the movable section is joined to a top of the baling half chamber via a third hinge, and is configured to move between the closed mode and the open mode by rotating about the third hinge.

In yet another variant, the movable section is joined to a top of the tying half chamber via a fourth hinge, and is configured to move between the closed mode and the open mode by rotating about the fourth hinge.

In a further variant the continuous baler further includes an elevator, wherein the movable section is joined to the elevator, such that the elevator is configured for raising the movable section to the open mode and for lowering the movable section to the closed mode.

In yet a further variant, the continuous baler further comprises a conveyor located between the baling half chamber and the tying half chamber, the conveyor being configured to carry the bale from the baling half chamber to the tying half chamber.

Optionally, the rear section of the conveyor is the floor of the tying half chamber.

In a variant, the continuous baler comprises a pressure sensor associated with at least one of the first rollers and/or at least one of the second rollers, and a first actuator configured for moving the movable section. The pressure sensor is configured for sensing a pressure exerted by the bale on the at least one of the first rollers and/or at least one of the second rollers when the movable section is in the closed mode, and for causing the first actuator to move the movable section to the open mode when the pressure reaches a predetermined pressure.

In another variant, the first circular path is larger than the second circular path, such that a closing of the movable section on the bale when the bale is in the tying the chamber is configured to compress the bale in the tying chamber.

In yet another variant, the continuous baler includes a second actuator and a sensing unit associated with the binding mechanism. The sensing unit is configured for detecting an end of a binding of the bale inside the tying chamber and for causing the gate to open in order to eject the bale out of the baler.

In a further variant, the continuous baler further comprises a second actuator and a proximity sensor associated with the tying chamber. The proximity sensor is configured for sensing a presence of the bale in the tying chamber and on the gate while the gate is open and for causing the second actuator to close the gate if the presence of the bale is sensed neither in the tying chamber nor on the gate.

In yet a further variant, the conveyor comprises: a conveyor belt; or a series of floor rollers disposed in a sequence one after the other; or the series of floor rollers disposed in a sequence one after the other and the conveyor belt, wherein the conveyor belt surrounds the series of the floor rollers.

Another aspect of some embodiments of the present invention relates to a method for forming crop bales. The method comprises: providing a baler; forming a baling chamber in the baler by joining a front half chamber of a movable section to a fixed half baling chamber; continuously collecting crop from a front side and leading the crop to a baling half chamber; rolling the crop to form a bale in the baling chamber; once the bale reaches a desired size and density, opening the baling chamber, by moving the movable section away from the baling half chamber; leading the bale to a fixed tying half chamber; forming a tying chamber by closing the movable section in order to join a rear half chamber of the movable section to the fixed tying half chamber; binding the bale in the tying chamber; once the bale is bound, opening a gate at a rear side of the baler; leading the bale out of the baler via the gate; once the bale is out of the baler, closing the gate.

In a variant, the forming of the tying chamber comprises simultaneously forming the baling chamber. The binding of the bale in the tying chamber comprises simultaneously forming a second bale in the baling chamber. The method comprises, after the closing of the gate, opening the baling chamber and leading the second bale to the tying half chamber.

In another variant, the forming of the tying chamber comprises compressing the bale in the tying chamber.

Another aspect of some embodiments of the present invention relaters to a continuous baler for forming bales of crop. The baler including a collection unit, a baling half chamber, a movable section, a tying half chamber, and a binding unit. The collection unit is located at a front end of the baler and is configured for collecting the crop from a ground on which the continuous baler travels. The baling half chamber is located behind the collection unit and is configured to receive the crop from the collection unit. The movable section is located aft of the baling half chamber, is movable between an open mode and a closed mode thereof, and includes a front half chamber on a front side of the movable section and a rear half chamber on a rear side thereof. The tying half chamber located is located behind the movable section, and includes a gate at an aft portion thereof. The binding unit is located in the rear half chamber or in the tying half chamber. In the closed mode of the movable section, the baling half chamber and the front half chamber are joined to form a baling chamber, and the tying half chamber and the rear half chamber are joined to form a tying chamber. The baling chamber is configured to rotate the crop received from the collection unit inside the baling chamber in order to form a bale. In the open mode of the movable section, the front half chamber is disposed away from the baling half chamber, thereby forming an opening in the baling chamber and enabling passage of the bale into the tying half chamber. The tying chamber is configured to cause the bale to rotate while activating the binding unit to bind the bale. The gate is configured for opening to release the bale out of the baler, after the bale is bound.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 11a and 11b illustrates an example of tying half chamber of the baler of FIG. 1, according to some embodiments of the present invention;

FIG. 18 is a side view of the inside of the baler of FIG. 1, during an ejection of a bale and simultaneous bale forming in the baling chamber, according to some embodiments of the present invention;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
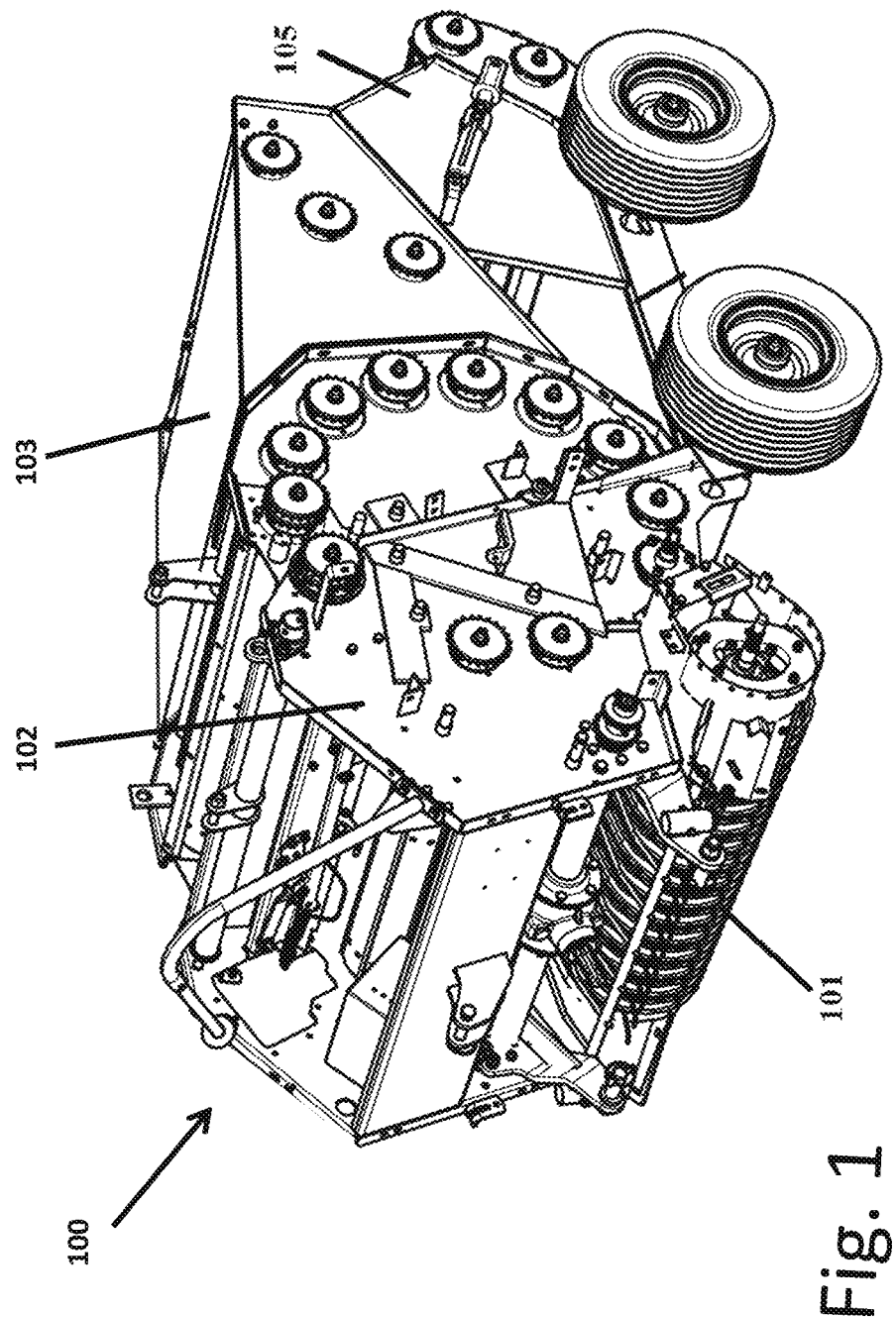
FIG. 1 is a perspective view of a baler according to some embodiments of the present invention.

FIG. 1 is a perspective view of a baler 100 according to some embodiments of the present invention.

The baler 100 of the present invention has a front side and a back side. The baler 100 includes collection unit 101 at the front side of the baler, followed by a fixed baling half chamber 102, a movable section 103, and a fixed tying half-chamber 105.

The baler 100 can be operated continuously, that is without interrupting the operation during discharge of a bale. The baler 100 may be used for forming bales from any crop, for example, grass, hay, straw and the like in dry or wet condition. The baler 100 might be powered by (carried by) a tractor or may be self-propelled.

Figure 2:
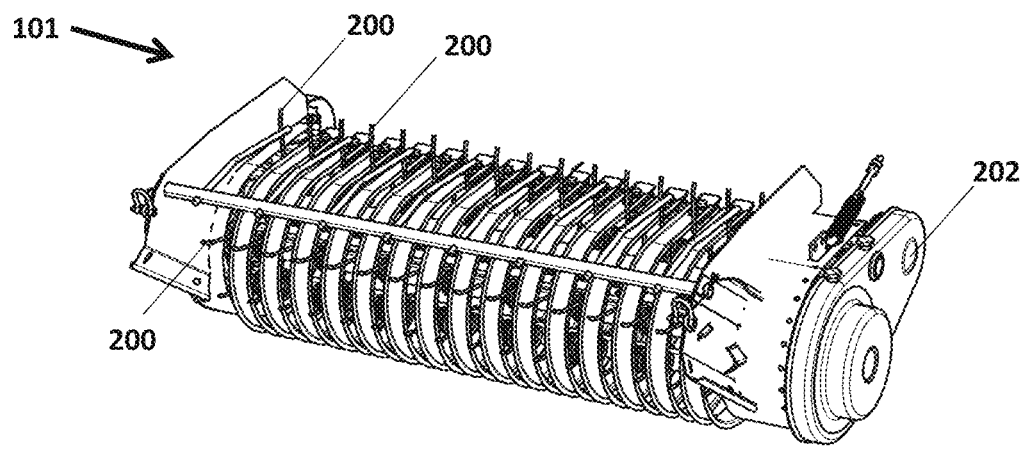
FIG. 2 is a perspective view of a collection unit of the baler of the FIG. 1, according to some embodiments of the present invention.

FIG. 2 is a perspective view of an example of the collection unit 101 of the baler 100 of the FIG. 1, according to some embodiments of the present invention.

The collection unit 101 is located at the front of the baler 100 and is configured for collecting crop from the floor and feed it to other units of the baler 100. Any crop collection mechanism may be used in the collection unit 101. In the non-limiting example of FIG. 2, the collection unit 101 includes a plurality of tines 200 rotating in vertical planes that raise crop from the ground and convey the crop upward. At the rear/outlet end of the collection unit 101, the collection unit 101 extends to the baling half chamber 102. In some embodiment of the present invention, the collection unit 101 includes blades (not shown) attached to chop the collected crop.

Optionally, the collection unit is joined to the baling half chamber 102 via a hinge 202. In this manner, the collection unit 101 can be lowered to the ground when the baler 100 collects crop and raised when the baler 100 is to travel without collecting crop. The latter configuration, with the raised collection unit is shown in FIG. 3.

Figure 3:
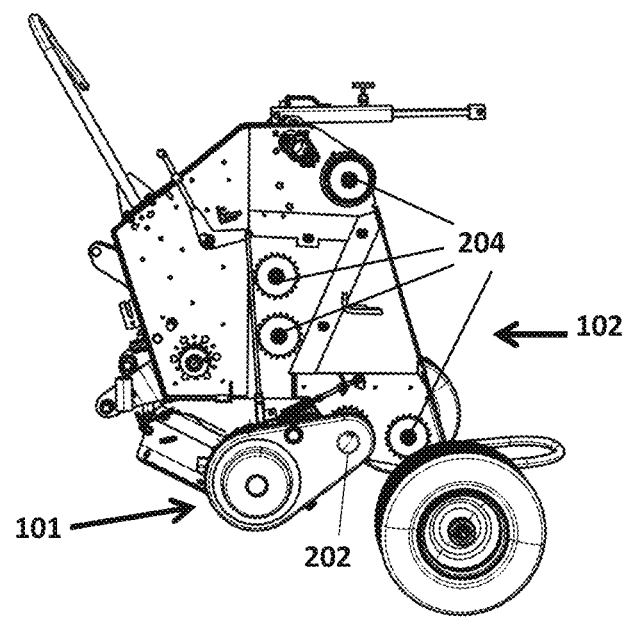
FIGS. 3 and 4 illustrate a baling-half chamber of the baler of FIG. 1, according to some embodiments of the present invention.
Figure 4:
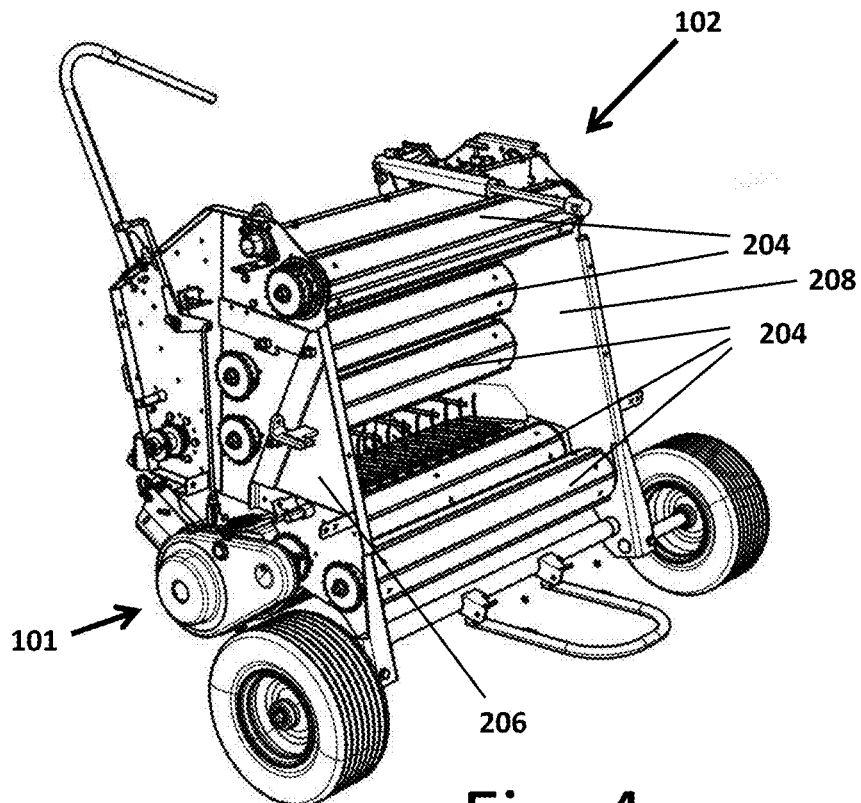

FIGS. 3 and 4 illustrate an example of baling-half chamber 102 of the baler 100 of FIG. 1, according to some embodiments of the present invention. FIG. 3 is a side view of the baling half chamber 102. FIG. 4 is a perspective rear view of the baling half chamber 102.

The fixed half chamber 102 is joined to the rear end of the collection unit 101. The fixed half chamber 102 includes a plurality of first horizontal rollers 204. The first rollers are parallel to each other, aligned with each other, and disposed between two first vertical walls 206 and 208 along a first arcuate path along a vertical plane. The two first vertical walls 206 and 208 are optionally parallel to each other.

Figure 5:
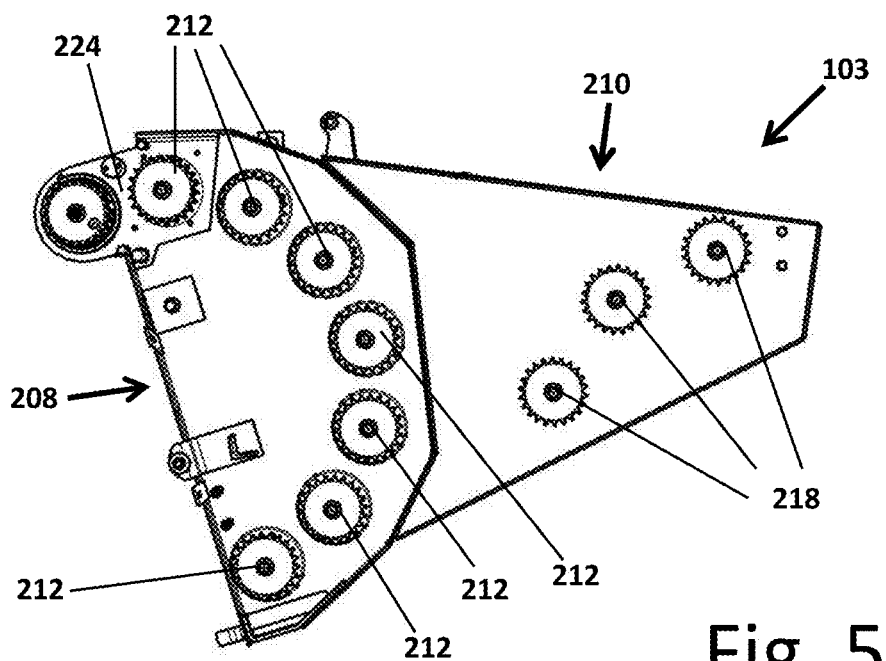
FIGS. 5-7 illustrate a movable section of the baler of FIG. 1, according to some embodiments of the present invention.
Figure 6:
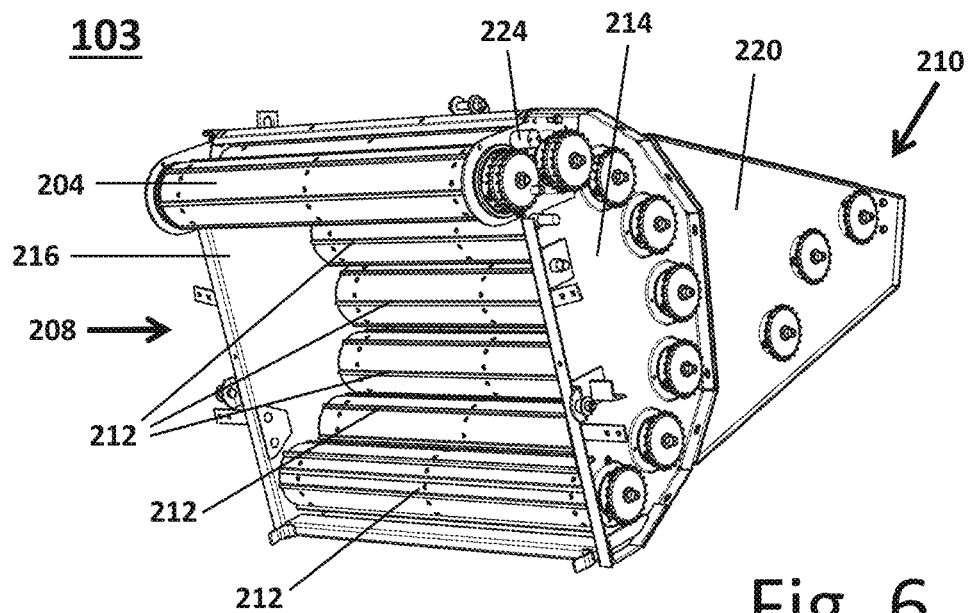
Figure 7:
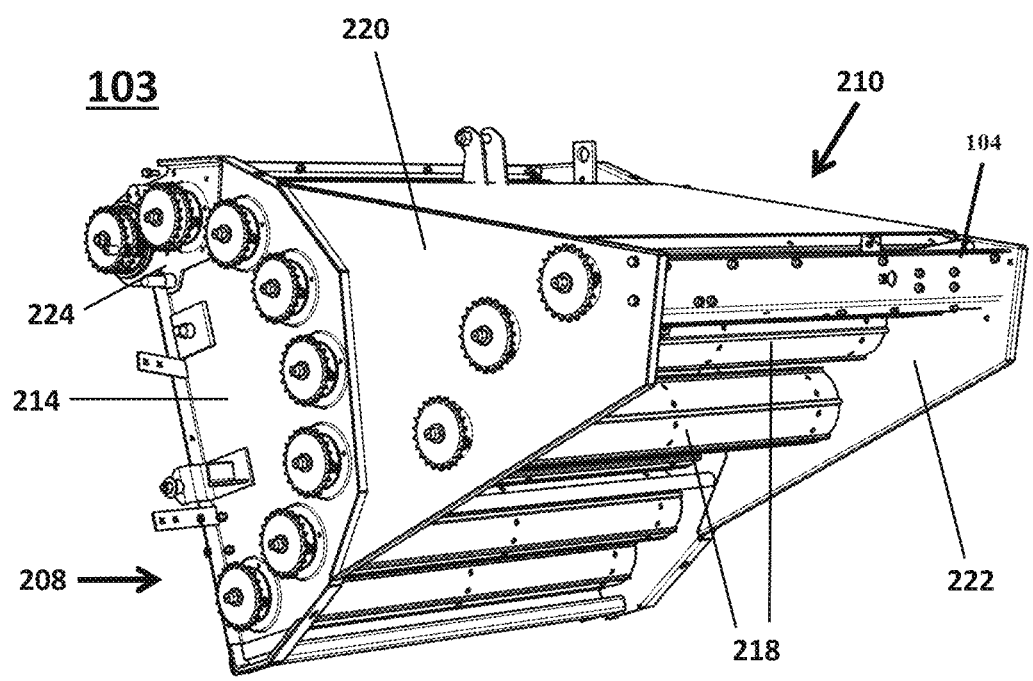

FIGS. 5-7 illustrate an example of the movable section 103 of the baler 100 of FIG. 1, according to some embodiments of the present invention. FIG. 5 is a side view of the movable section 103. FIG. 6 is a front perspective view of the movable section 103. FIG. 7 is a read perspective view of the movable section 103.

The movable section 103 includes a front half chamber 208 at the front of the movable section 103 and a rear half chamber 210 at the rear of the movable section 103. The movable section 103 has an open mode/configuration and a closed mode/configuration. In the closed mode/configuration, the front half chamber 208 is joined to the baling half chamber 102 to form a baling chamber in which a bale is formed from collected crop, and the rear half chamber 210 is joined to the tying half chamber 105 to form a tying chamber in which a bale is tied or wrapped. In the open mode/configuration, the bale is transferred from the baling half chamber 102 to the tying half chamber 105.

The front half chamber 208 has a plurality of second rollers 212, which are parallel to each other and to the first rollers 204 of the baling half chamber 102, aligned with each other, and disposed between two second vertical walls 214 and 216 along a second vertical arcuate path. The two second vertical walls 214 and 216 are optionally parallel to each other.

The rear half chamber 210 is located behind the front half chamber. The rear half chamber 210 includes third rollers 218 which are parallel to each other, aligned with each other, and disposed between two third vertical walls 220 and 222 along a third vertical arcuate path. The third rollers are 210 are parallel to and aligned with the rollers of the gate (as will be explained further below). The two third vertical walls 220 and 222 are optionally parallel to each other. In some embodiments of the present invention, the third rollers 210 are also parallel to second rollers 212.

In some embodiments of the present invention, the rear half chamber 210 includes a binding device 104 configured for binding the bale when the bale is inside the tying chamber formed by the rear half chamber 210 and the tying half chamber 105 when the movable section 103 is in its closed mode. The binding device 104 may, for example bind the bales by binding the bales with twine or wrapping the bales with mesh or plastic film.

In the embodiments in which twine is used, the binding device 104 includes a triggering mechanism, a first arm, a worm gearbox pulley, and a clipping arm. The triggering mechanism extends the arm to the top of the bale. The arm falls when the bale reaches a predetermined size. Twine is routed to the arm through rollers, connected to the worm gearbox pulley, and connected with a second arm which acts as crank. Twine extends to somewhat one foot from the arm to catch hold the bale. When the twine catches the bale, the arm moves longitudinally along the bale, hence tying the twin over the bale at a definite pitch. An automated cutting mechanism is provided, which cuts the twine at a desired point, to allow the twine to be used for the next bale.

In the embodiments in which mesh or plastic film is used as binding material, the binding material is fed electrically or by other means through gripping rollers when the desired bale size is reached. After wrapping, the gripping rollers brake to stop feeding the binding material and a cutting mechanism is actuated to cut the mesh/film (not shown).

The movable section 103 is movable with respect to the baling half chamber 102 and the tying half chamber 105. In some embodiments of the present invention the movable section 103 is hinged to the top of the baling half chamber 102 and is configured for rotating around the hinge in order to achieve the open and closed modes. Optionally, the movable section 103 has a hinge mechanism 224 joined to the top roller of the first rollers 204, so that the rotation of the movable section 103 occurs around the top first roller 204.

Figure 8:
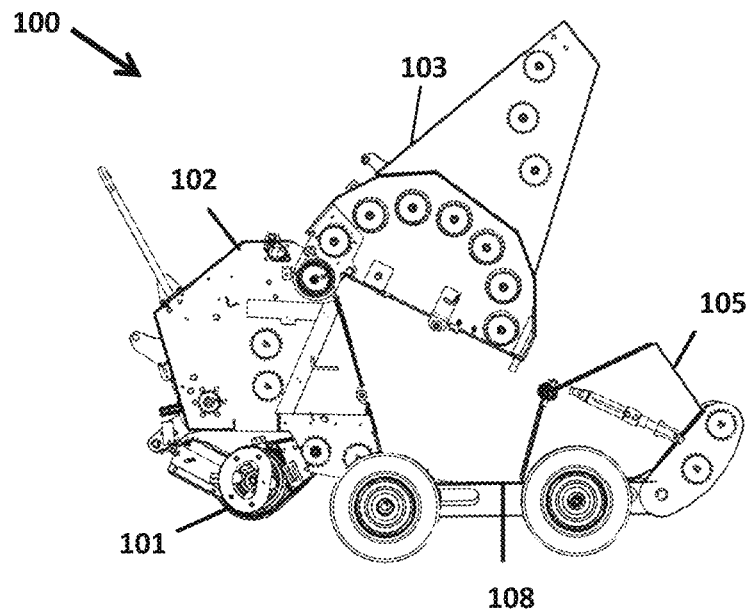
FIG. 8 illustrates an example of a baler of the present invention, in which the moving section is hinged to the baling half chamber.
Figure 19A:
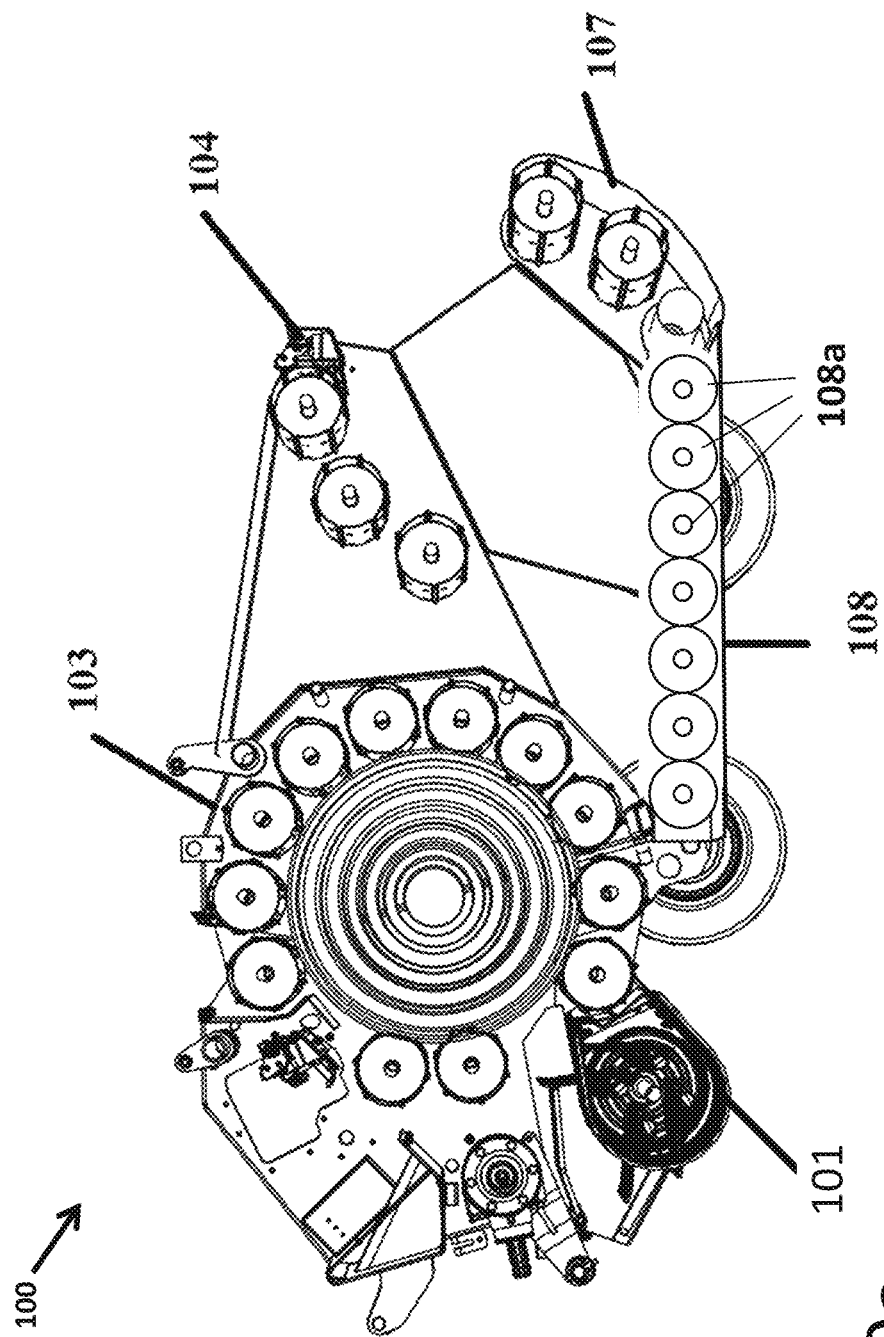
FIGS. 19a and 19b are side views of an inside of the baler of FIG. 1, having a conveyor which includes a plurality of floor rollers disposed one after the other in a sequence, according to some embodiments of the present invention.
Figure 19B:
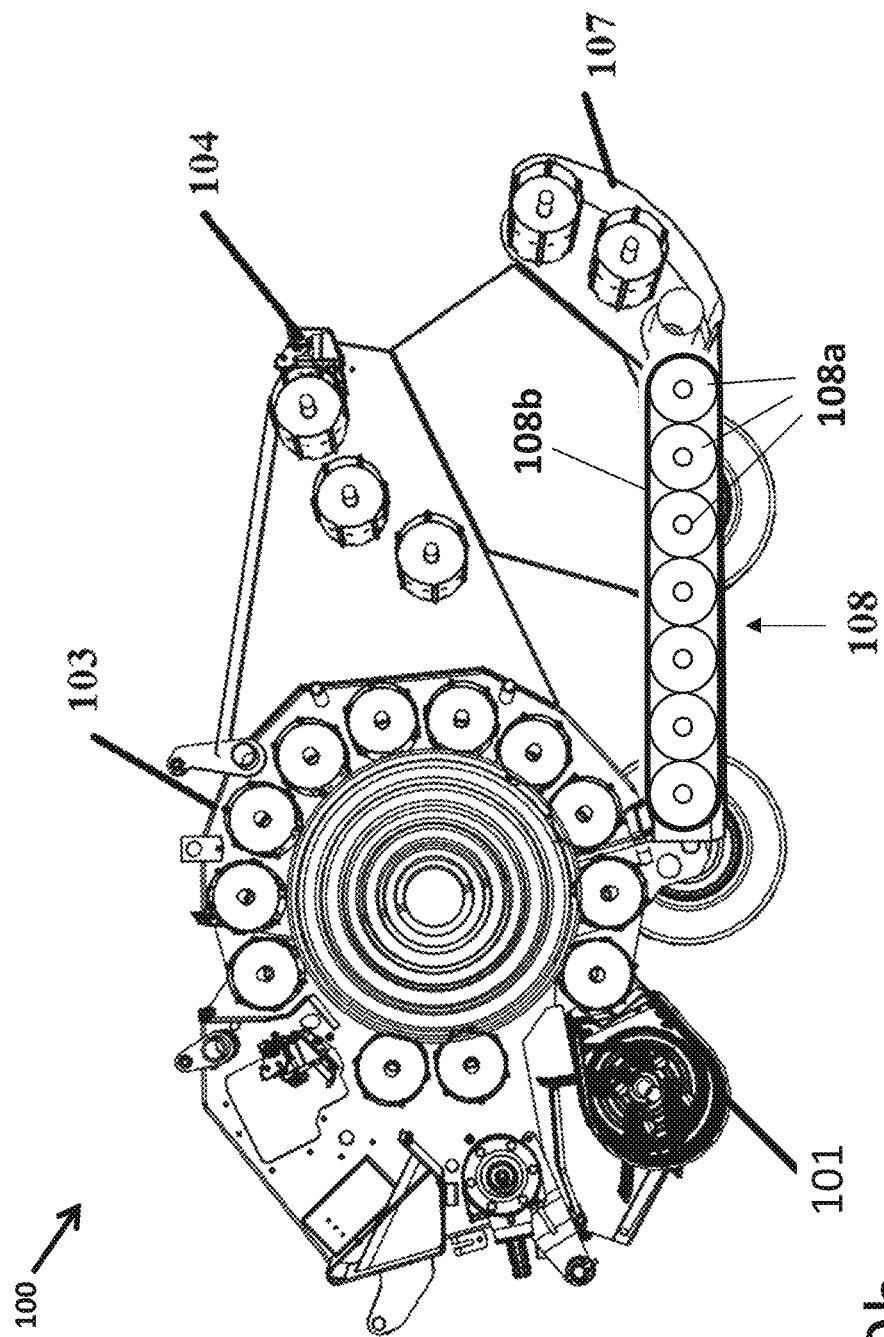
Figure 20:
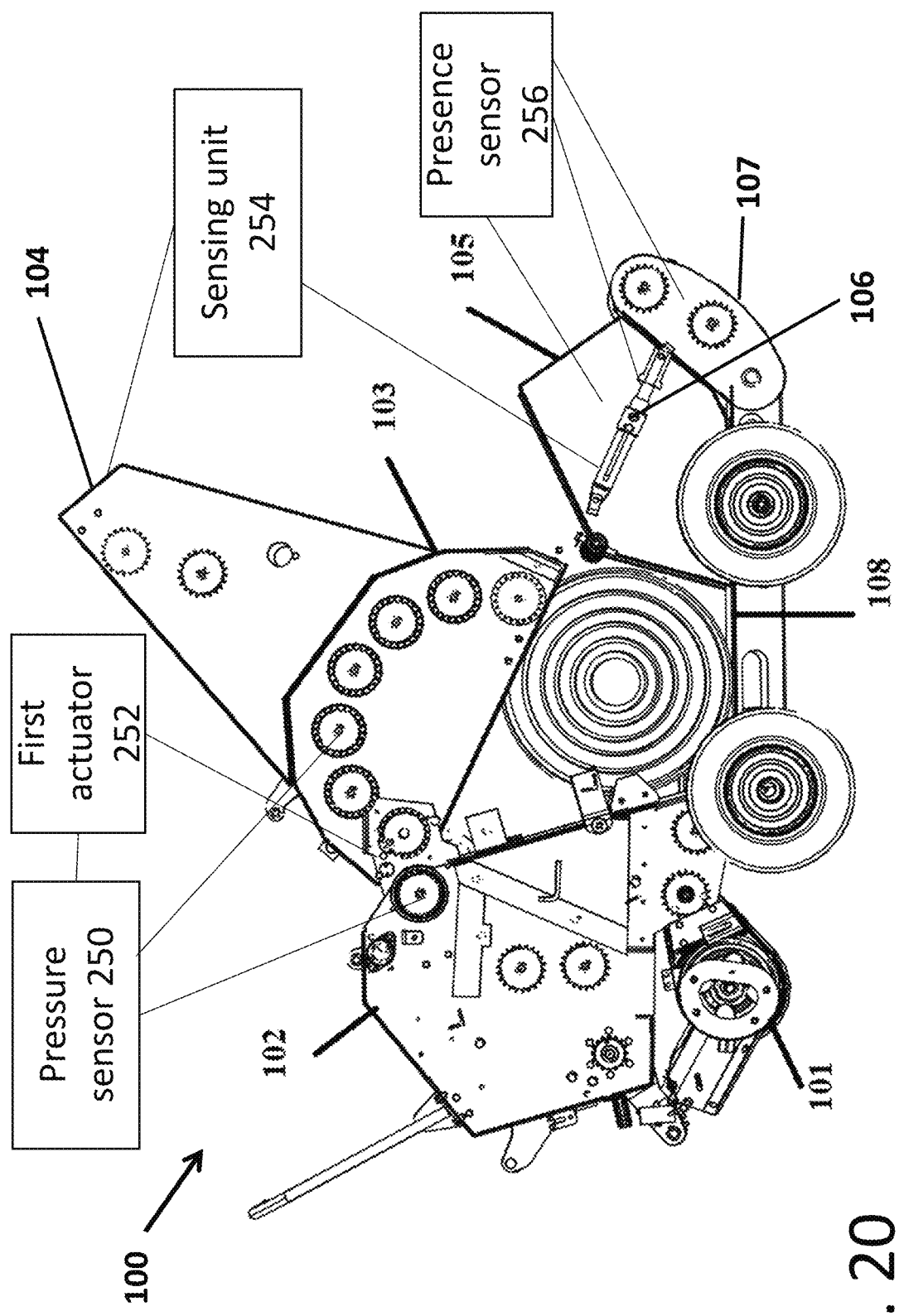
FIG. 20 is a schematic drawing of a baler of the present invention having sensors and actuators controlling the operation of the baler, according to some embodiments of the present invention.

Such embodiments are shown in detail in FIG. 8, which illustrates an example of a baler 100 of the present invention, in which the moving section 103 is hinged to the top of the baling half chamber 102. In some embodiments of the present invention, the baler 100 includes a conveyor 108 located between the baling half chamber 102 and the tying half chamber 105, under the movable section 103. The conveyor 108 is configured to carry the bale from the baling half chamber 102 to the tying half chamber 105. The conveyor 108 may include horizontal rollers, a conveyor belt, or chain and slate mechanism. The conveyor 108 may be in the form of a conveyor belt as seen for example in FIGS. 14 and 17, or may be in the form of a plurality of floor rollers 108a disposed one after the other to form the floor of the baler 100 as seen in FIG. 19a, or may include the floor rollers 108a and the conveyor belt 108b surrounding the floor rollers 108a as seen in FIG. 19b.

Figure 9:
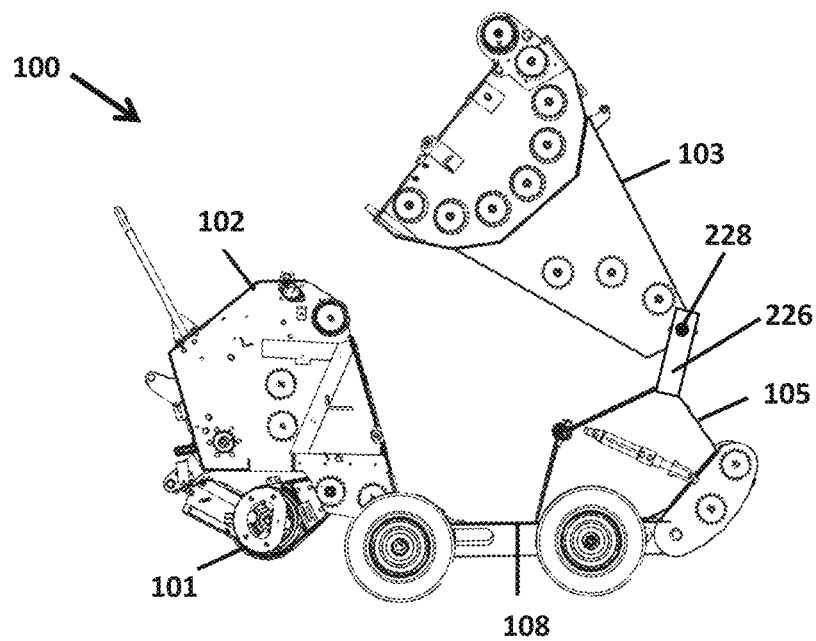
FIG. 9 illustrates an example of a baler of the present invention, in which the moving section is hinged to the tying half chamber.

In a variant, the movable section 103 is hinged to the tying half chamber 105, as shown in the example of FIG. 9. In some embodiments of the present invention, the tying half chamber 105 includes an extension 226 and a hinge mechanism 228 near the top of the extension 226. The hinge mechanism is joined to the rear half chamber of the movable section 103 and allows rotation of the movable section 103 around the hinge 228.

Figure 10:
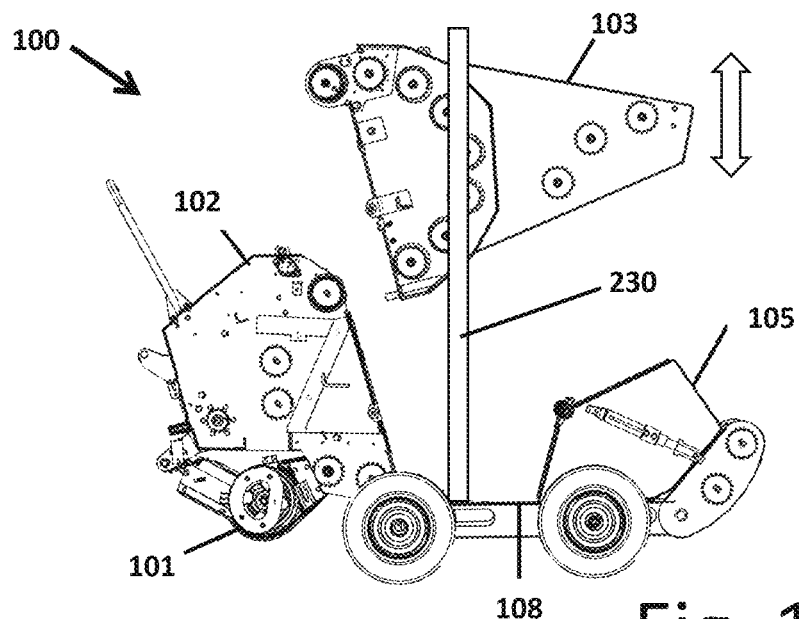
FIG. 10 illustrates an example of a baler of the present invention, in which the moving section is joined to an elevator.

In a variant, the movable section 103 is movable via an elevator. This is shown in detail in the example of FIG. 10. The baler 100 includes an elevator 230 and the movable section 103 is joined to the elevator, such that the elevator is configured for raising and lowering the movable section 103. When the movable section 103 is in a raised configuration, it is in the open mode, allowing passage of a bale from the baling half chamber 102 to the tying half chamber 105. When the movable section 103 is in a lowered configuration, it is in a closed mode, such that the baling half chamber 102 and the front half chamber of the movable section 103 are joined to form a baling chamber configured for forming bales from collected crop, while the tying half chamber 105 and the read half chamber of the movable section 103 are joined to form a tying chamber configured for tying and/or wrapping a bale located therein.

Figure 11A:
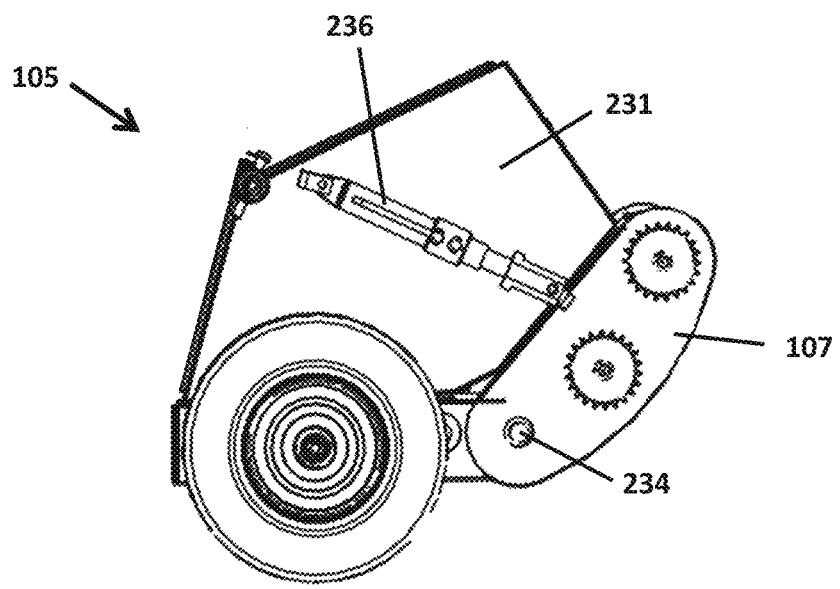

FIGS. 11a and 11b illustrate an example of a tying half chamber 105 of the baler 100 of FIG. 1, according to some embodiments of the present invention. FIG. 11a is a side view of the tying half chamber 105. FIG. 11b is a perspective side of the tying half chamber 105 joined to the rear half chamber 210.

The tying half chamber 105 includes two fourth vertical walls 232 and 231 and a gate 107. The fourth vertical walls 232 and 231 are opposing side walls of the tying half chamber 105, and are optionally parallel to each other and to the walls 220 and 222 of the rear half chamber 210 of the movable section 103. The gate 107 is substantially perpendicular to the fourth walls 232 and 231 and is the rear wall of the tying half chamber 105.

The gate 107 is hinged to the rear a floor of the tying half chamber 105 and is configured for rotating around the hinge 234 to open and close. When the gate is closed, the bale is retained inside the tying half chamber 105. When the gate 107 is open, the bale is released from the rear of the baler 100. In some embodiments of the present invention, the gate 107 opens and closes by automatic sensor actuation. The binding mechanism 104 is associated with a sensing unit configured for detecting the end of the binding of the bale and causing the gate 104 to open to release the bound bale. In some embodiments of the present invention, the binding includes wrapping with plastic film/mesh and the sensing unit includes proximity sensors. In some embodiments of the present invention, the binding includes tying with a twine, and the sensing unit may include limit switches. The gate 107 may be operated by means of an electric or hydraulic actuator 236. Optionally, the floor of the tying half chamber 105 includes the rear section of the conveyor 108.

In some embodiments, of the present invention, tying half chamber 105 includes a binding mechanism like the binding mechanism 104 shown in FIG. 7.

Figure 12:
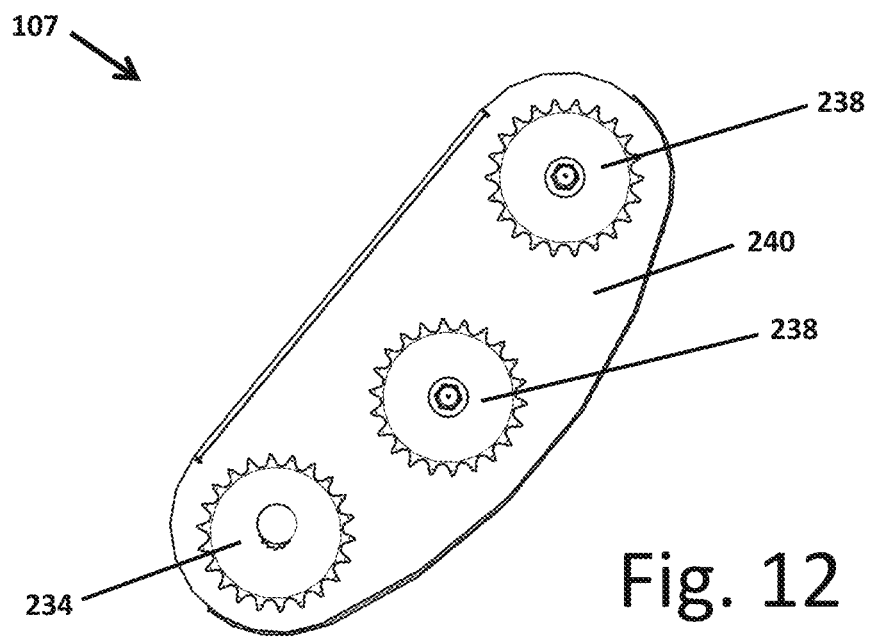
FIGS. 12 and 13 illustrate an example of the gate of the baler of FIG. 1, according to some embodiments of the present invention.
Figure 13:
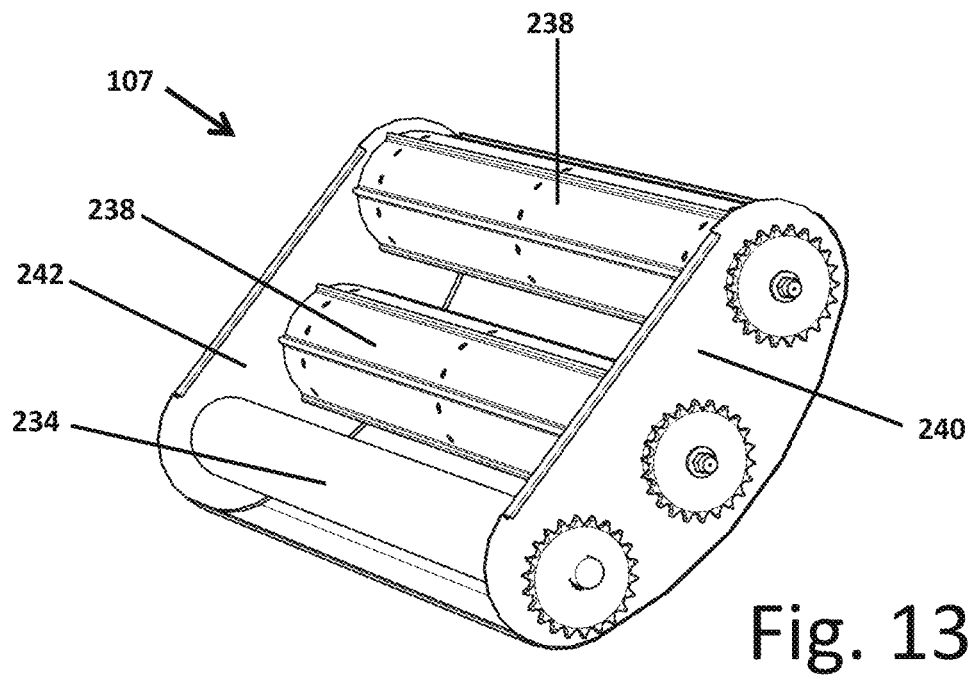

FIGS. 12 and 13 illustrate an example of the gate 107 of the baler 100 of FIG. 1, according to some embodiments of the present invention. FIG. 12 is a side view of the gate 107, while FIG. 13 is a perspective view of the gate 107.

The gate 104 includes a plurality of fourth horizontal rollers 238 parallel to the third horizontal rollers 218 of the rear half chamber 210 and disposed along fourth vertical arcuate path. Optionally, the fourth horizontal rollers 238 are held between two fifth vertical walls 240 and 242 defining sides of the gate 104.

As mentioned above, the gate is configured to open and close by rotating around a hinge 234. The hinge 234 may be one of the fourth rollers of the gate. In some embodiments of the present invention, the hinge 234 is the lowermost roller of the gate and is joined to the floor of the tying half chamber.

Figure 14:
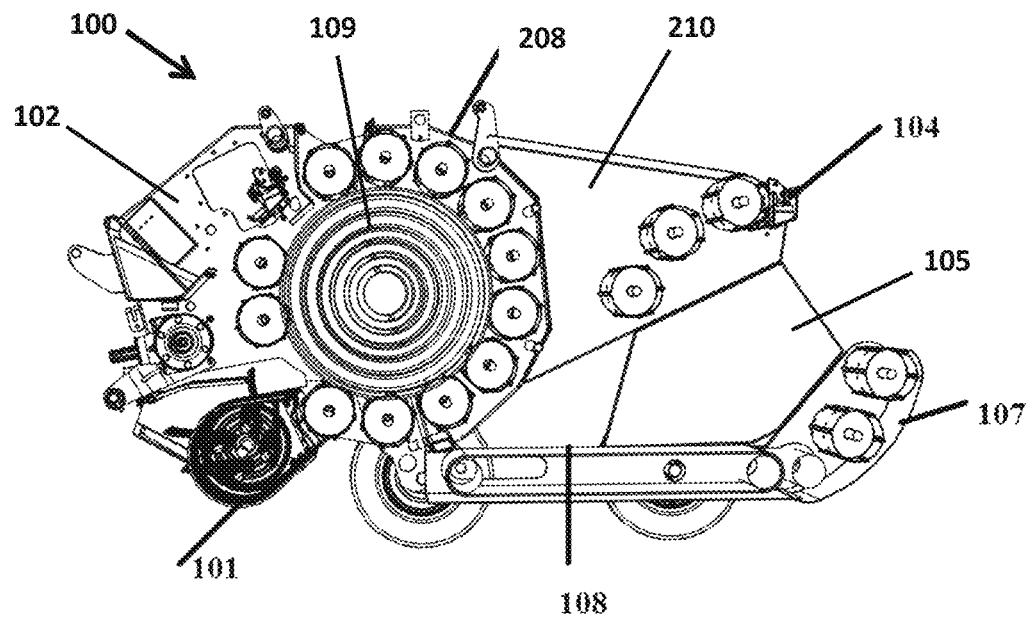
FIG. 14 is a side view of the inside of the baler of FIG. 1, during bale forming in the baling chamber, according to some embodiments of the present invention.
Figure 15:
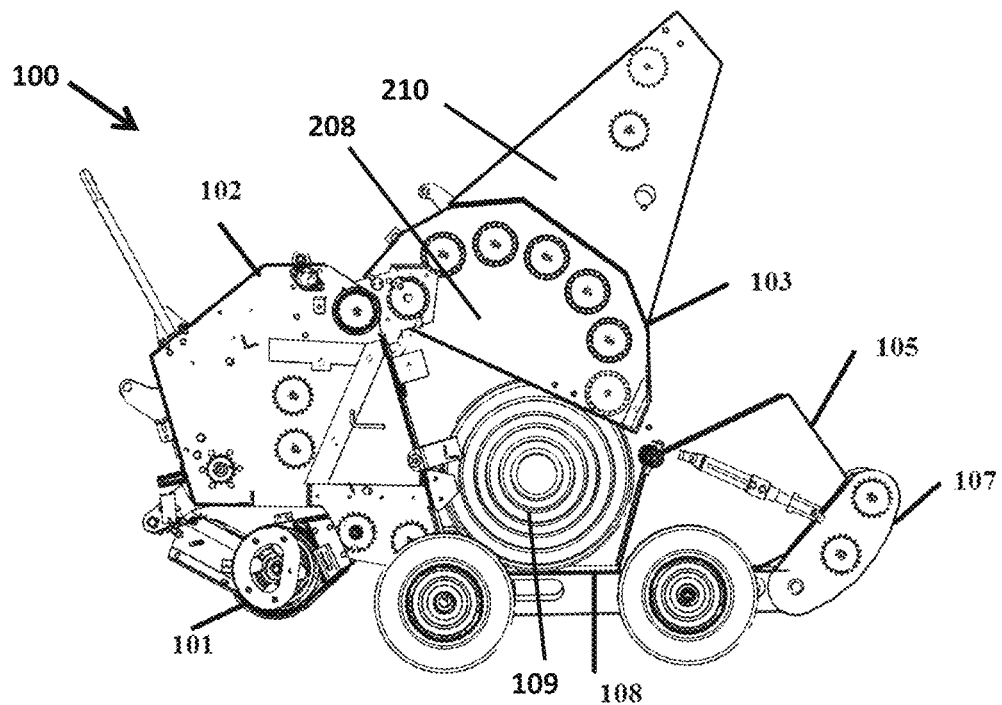
FIG. 15 is a side view of the baler of FIG. 1, during a transfer of a bale to the tying half-chamber, by opening the movable section, according to some embodiments of the present invention.
Figure 16:
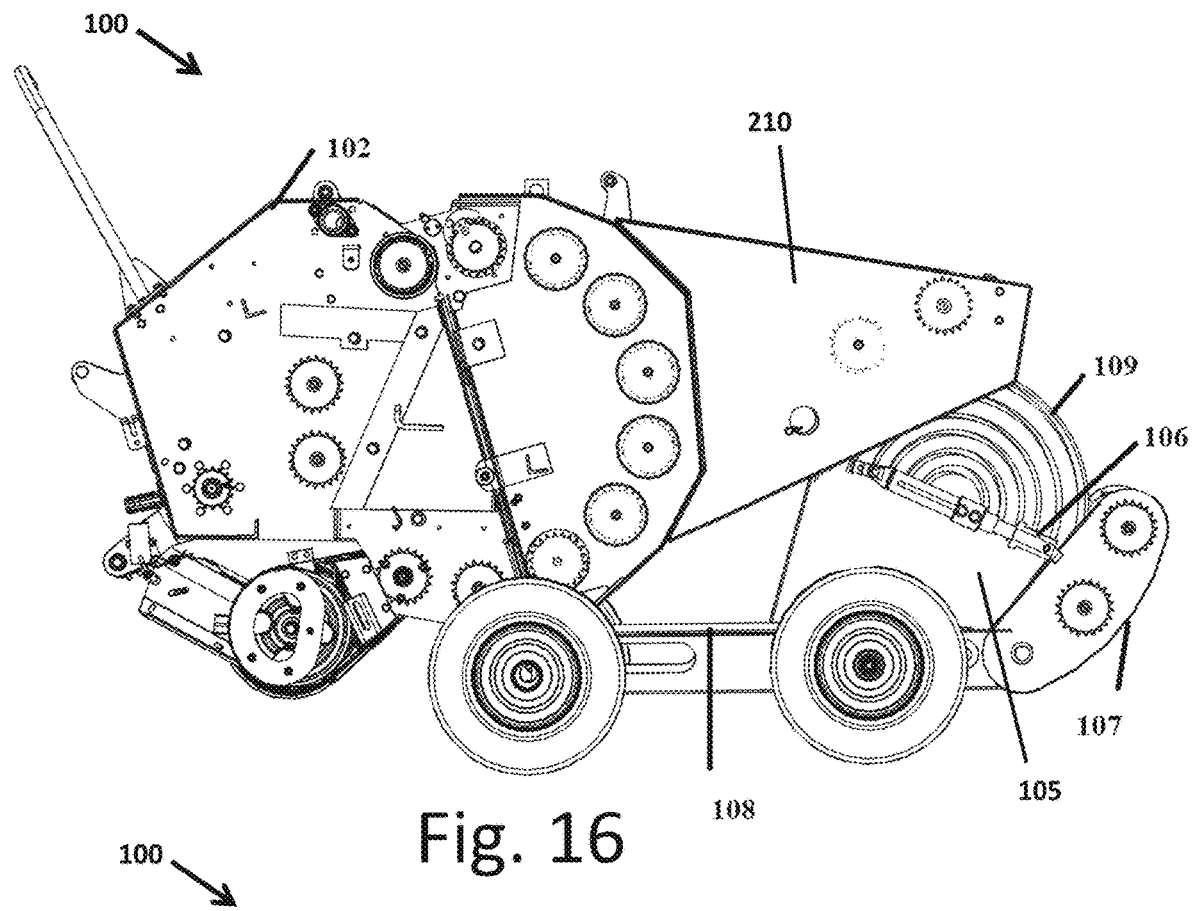
FIG. 16 is a side view of the baler of FIG. 1, during a tying of a bale in the tying chamber, according to some embodiments of the present invention.
Figure 17:
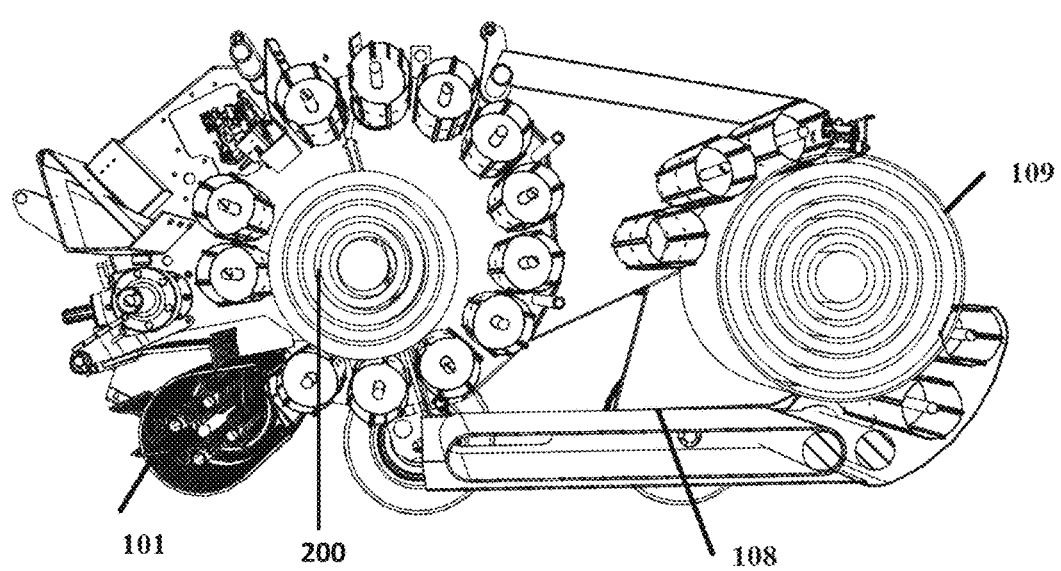
FIG. 17 is a side view of the inside of the baler of FIG. 1, during tying in the tying chamber and simultaneous bale forming in the baling chamber, according to some embodiments of the present invention.

FIG. 14 is a side view of the inside of the baler 100 of FIG. 1, during bale forming in the baling chamber, according to some embodiments of the present invention. FIG. 15 is a side view of the baler 100 of FIG. 1, during a transfer of a bale to the tying half-chamber, by opening the movable section, according to some embodiments of the present invention. FIG. 16 is a side view of the baler 100 of FIG. 1, during a tying of a bale in the tying chamber, according to some embodiments of the present invention. FIG. 17 is a side view of the inside of the baler 100 of FIG. 1, during tying in the tying chamber and simultaneous bale forming in the baling chamber, according to some embodiments of the present invention. FIG. 18 is a side view of the inside of the baler of FIG. 1, during an ejection of a bale and simultaneous bale forming in the baling chamber, according to some embodiments of the present invention.

Initially (FIG. 14), the movable section 103 is in its closed mode. Thus, the baling half chamber 102 and the front half chamber of 208 of the movable section 103 are joined together to form a baling chamber. The first arcuate path of the first rollers and the second arcuate path of the second rollers form a first circular path. Thus, the inside of the baling chamber is substantially cylindrical.

As the baler 100 moves forward, the collection unit 101 collects crop and feeds the crop into baling chamber. In the baling chamber the first and second rollers rotate to cause the crop to roll around inside the baling chamber. As more crop is fed into the baling chamber, a cylindrical bale 109 is formed. As the bale 109 increase size and density, the bale pushes against the rollers with increasing force.

In FIG. 15, the bale 109 is fully formed by reaching a desired size and density, and therefore pushes against the rollers with a certain pressure. One or more pressure sensors associated with at least one of the first and/or second rollers detect the pressure and cause an actuator of the movable section 103 to open the movable section by moving the front half chamber away from the baling half chamber, thereby opening the baling chamber. The bale 109 is released from the baling half chamber 102 and allowed passage to the tying half chamber 105. If present, the conveyor 108 guides the bale 109 from the bling chamber 102 to the tying half chamber 105.

In FIG. 16, the bale 109 reaches the tying half chamber 105, and the movable section 103 closes. In this manner, the rear half chamber 210 of the movable section 103 joins the tying half chamber 105 to form a tying chamber. The third arcuate path of the third rollers and the fourth arcuate path of the fourth rollers are opposite sides of a second circular path. The third and fourth rollers rotate causing the bale 109 to rotate about its cylindrical axis. As the bale 109 rotates, the binding unit located in the rear half chamber or in the tying half chamber binds the bale 109, as described above. Optionally, the size of the second circular path of the tying chamber is smaller than the size of the first circular path of the baling chamber. Therefore, as the movable section 103 closes, the bale 109 is compressed inside the tying chamber. In some embodiments of the present invention, while the bale 109 rotates within the tying chamber, no crop is introduced from outside into the tying chamber.

It should be noted that the fixed vertical walls of the tying half chamber 105 ensure that loose portions of dry crop are not lost from the bale during the binding of the bale.

As mentioned above, the baler 100 of the present invention is configured to operate continuously. The collection unit 101 is configured for continuously collecting crop. Even as the bale 109 is being tied, new crop is being collected and a new bale 200 is being formed in the baling chamber, as seen in FIG. 17. Therefore, the baler's operation is not stopped at any time.

In FIG. 18, the first bale 109 has been tied, and is released from the baler 100 by opening the gate 107 and guiding the bale 109 via the fourth rollers of the gate 107. In the meantime, while the movable section 103 is still closed, the second bale 200 is still being formed. Once the first bale is out, the gate 107 is closed, and the process started in FIG. 14 repeats for the second bale 200. In some embodiment of the present invention, the baler includes a proximity sensor associated with the tying chamber, to detect the presence of the bale inside the tying chamber or on the gate, once the gate has been opened. If the proximity sensor detects that the bale is no longer in the tying chamber, the proximity sensor causes the actuator 106 to close the gate. In a variant, the proximity sensor includes a weight sensor associated with the floor of the tying half chamber and/or the gate. Any other proximity sensors known in the art may be used to determine the presence or absence of the bale.

In the present invention, a single baling chamber is formed, which has a fixed section (the baling half chamber). The collection unit continuously collects crop and feeds the crop to the baling half chamber. In this manner, there is no need to a complex control of the collection unit, or a need to feed the crop to different baling chambers. Moreover, in the present invention, first and/or second rollers are associate with a pressure sensor, so that once the bale reaches a desired size and density, the associated pressure is detected, and the movable section is opened. In this manner there is no need for complex bale density measurement systems.

It should be noted that expression "half-chamber" does not mean the exact half of a chamber. Rather, the expression refers to a part of a chamber, which when joined to "half-chamber" forms a closed chamber.

FIG. 19 is a schematic drawing of a baler of the present invention having sensors and actuators controlling the operation of the baler.

The baler 100 includes at least one pressure sensor 250, a first actuator 252, a sensing unit 254, and a proximity sensor 256.

The pressure sensor 250 is associated with at least one of the first rollers of the baling half chamber 102 and/or with at least one of the second rollers of the movable section 103. The pressure sensor 250 is configured to measure the pressure exerted by the bale on at least one of the first and/or second rollers. Once the bale reaches a desired size and density, the pressure reaches a predetermined threshold, and the pressure sensor 250 sends a signal to the first actuator 252 to move the movable section 103 to its open mode, to allow the bale to be guided to the tying half chamber 105. The first actuator 252 is associated with the movable section 103 and is configured for moving the movable section 103 between its open and closed modes, as described above in FIGS. 8-10.

The sensing unit 254 is associated with the biding unit 104 and is configured for sensing an end of the binding of the bale, as described above. Once the end of the binding is sensed, the sensing unit 254 sends an activation signal to the actuator 106 to open the gate 107, in order to eject the bound bale.

The proximity sensor 256 is configured to sense the presence of a bale in the tying chamber and on the gate 107 after the gate has been opened, as explained above. Once the proximity sensor 256 senses that the bale is neither in the tying chamber nor on the gate 107, the bale has been ejected from the baler and the proximity sensor 256 sends a signal to the actuator 106 to close the gate in preparation of the binding of the next bale.

FIGS. 21-30 refer to some embodiments of the present invention, in which a continuous baler 400 has an upward-swinging gate 107 at the rear of the baler.

Figure 21:
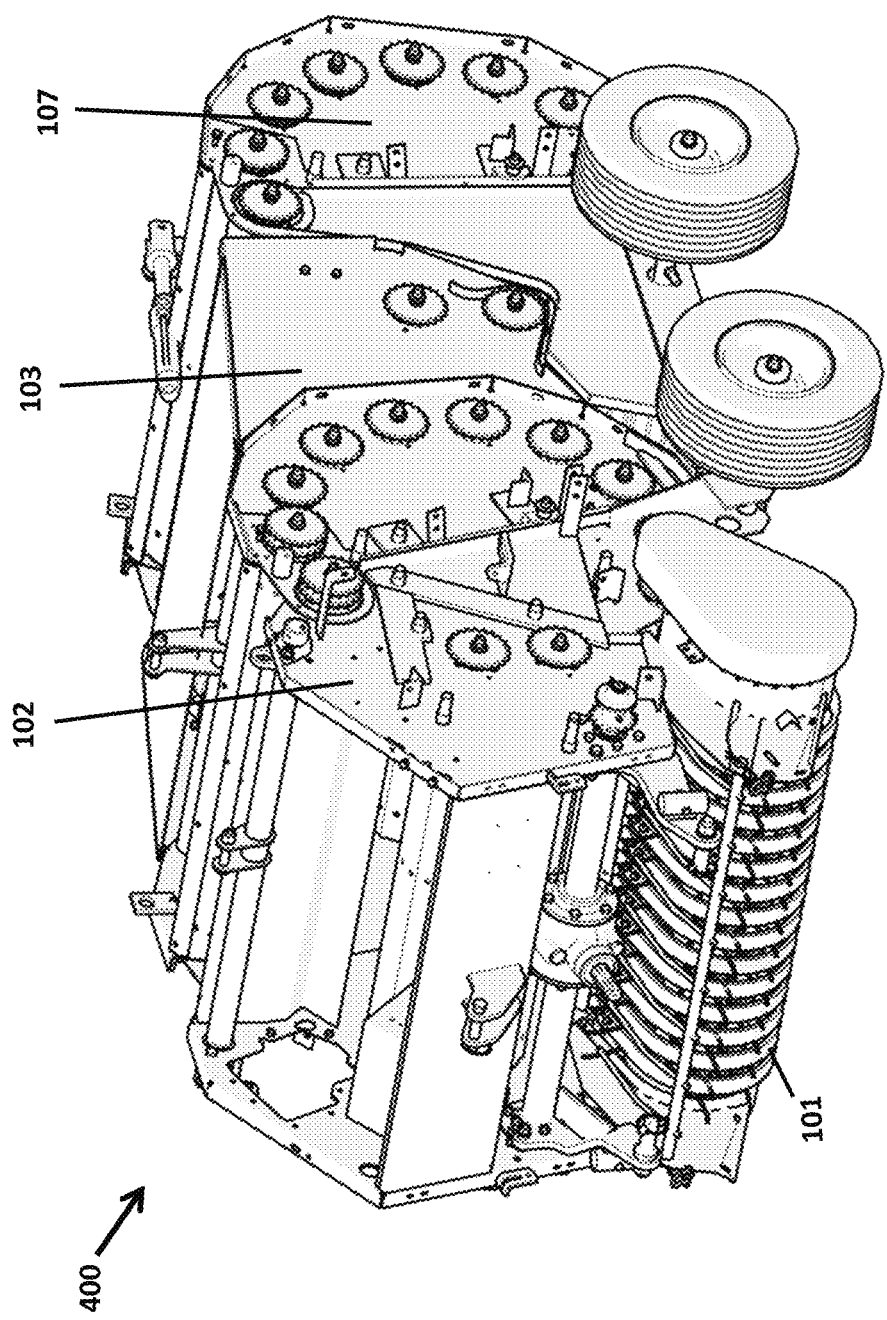
FIG. 21 is a perspective view of a baler having an upward-swinging gate, according to some embodiments of the present invention.
Figure 22:
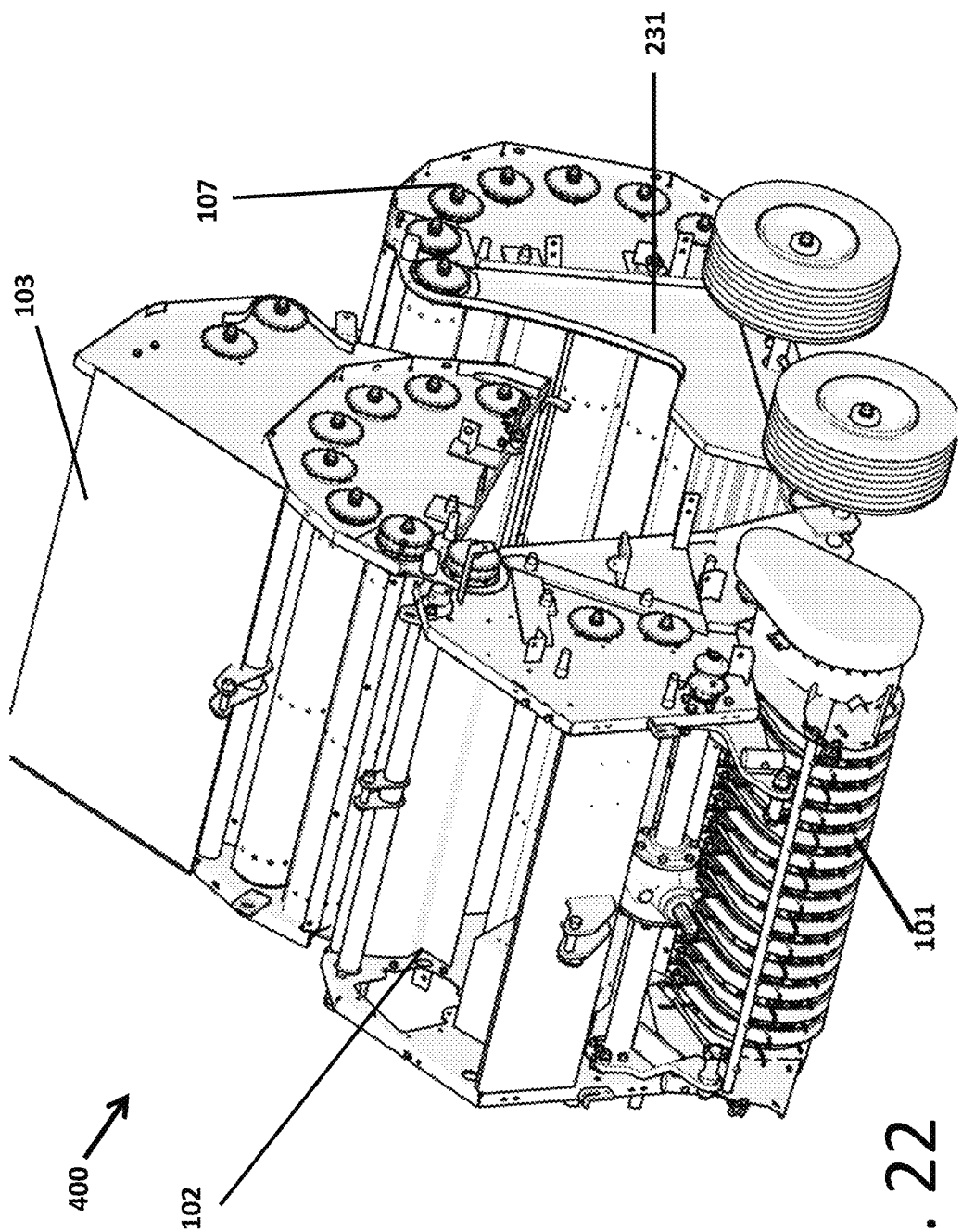
FIG. 22 is a perspective view of a baler having an upward-swinging gate with the movable portion in an open mode, according to some embodiments of the present invention.
Figure 23:
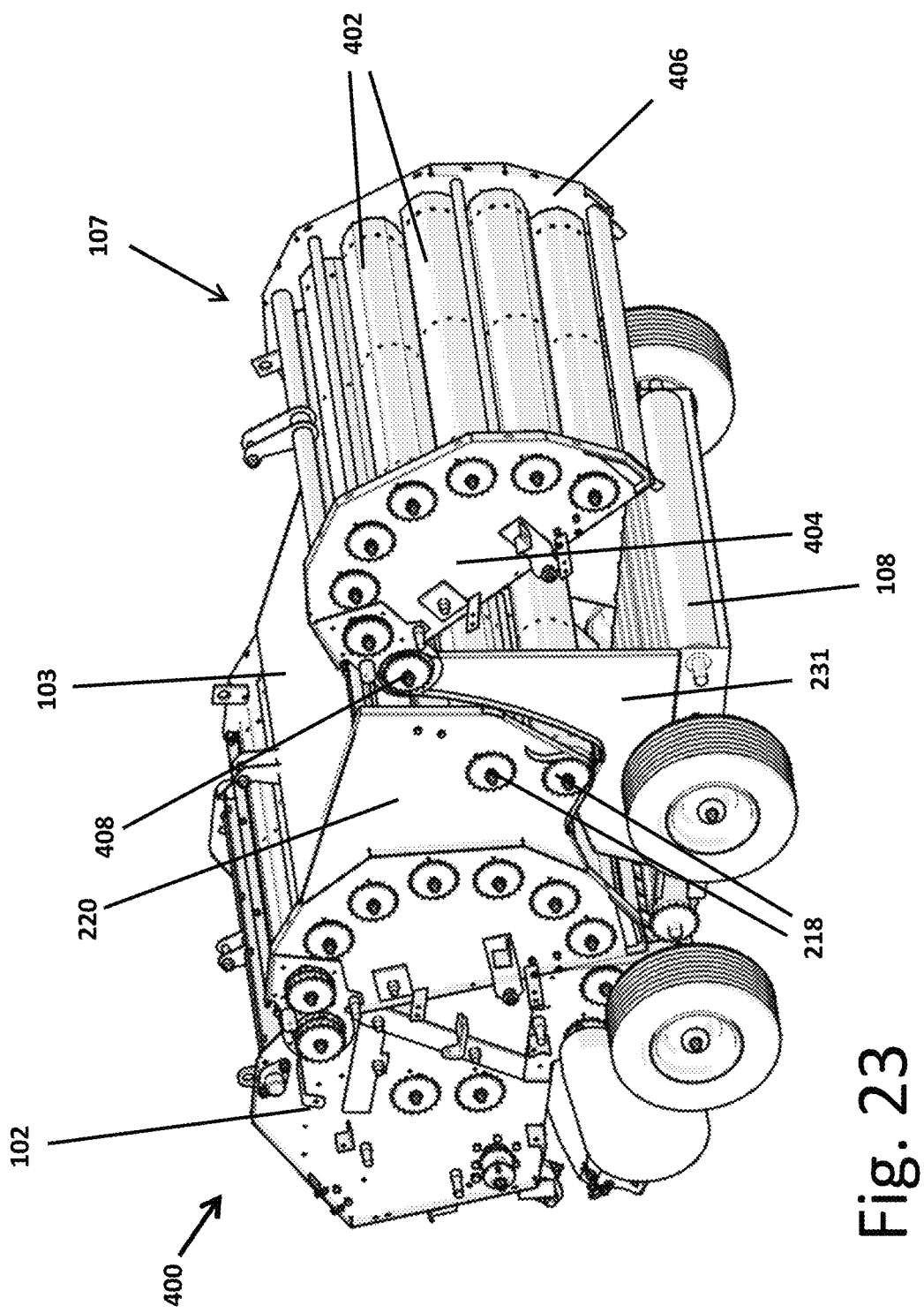
FIGS. 23 and 24 and perspective views of a baler having an upward-swinging gate when the gate is open, according to some embodiments of the present invention.
Figure 24:
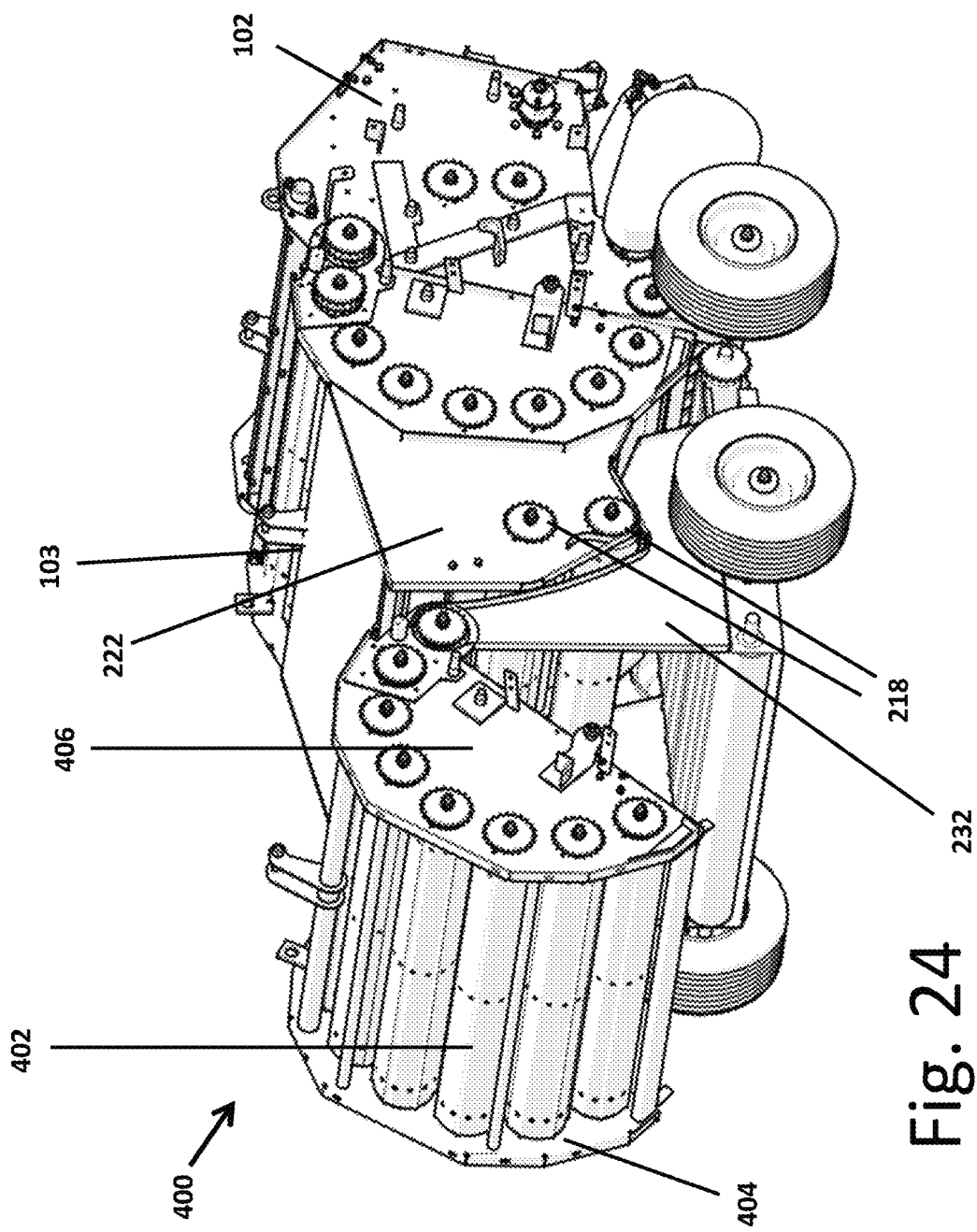
Figure 25:
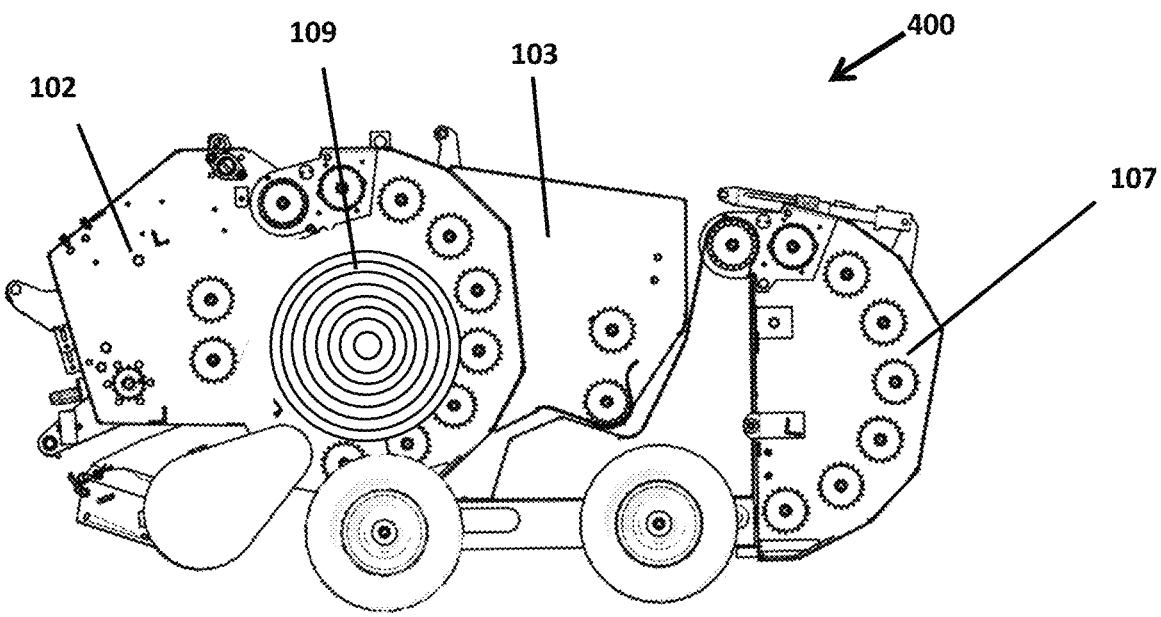
FIG. 25 is a schematic view of the baler of FIG. 21, during the production of a bale in the baling chamber, according to some embodiments of the present invention.
Figure 26:
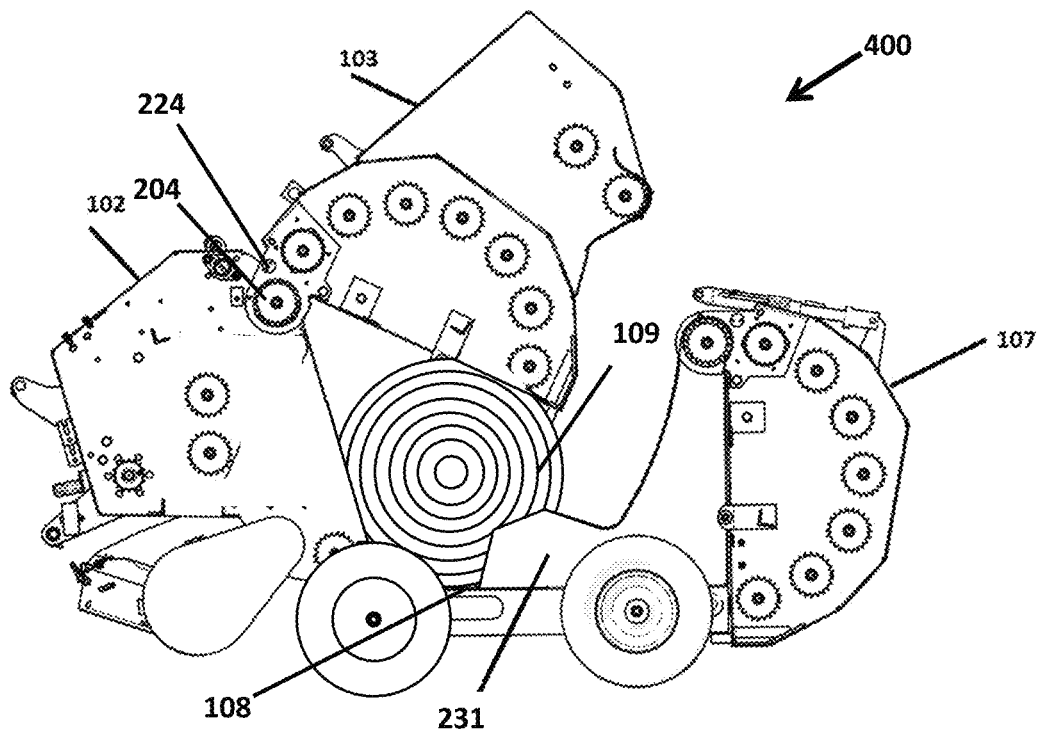
FIG. 26 is a schematic view of the baler of FIG. 21, while the bale is being transferred from the baling half chamber to the tying half chamber, according to some embodiments of the present invention.
Figure 27:
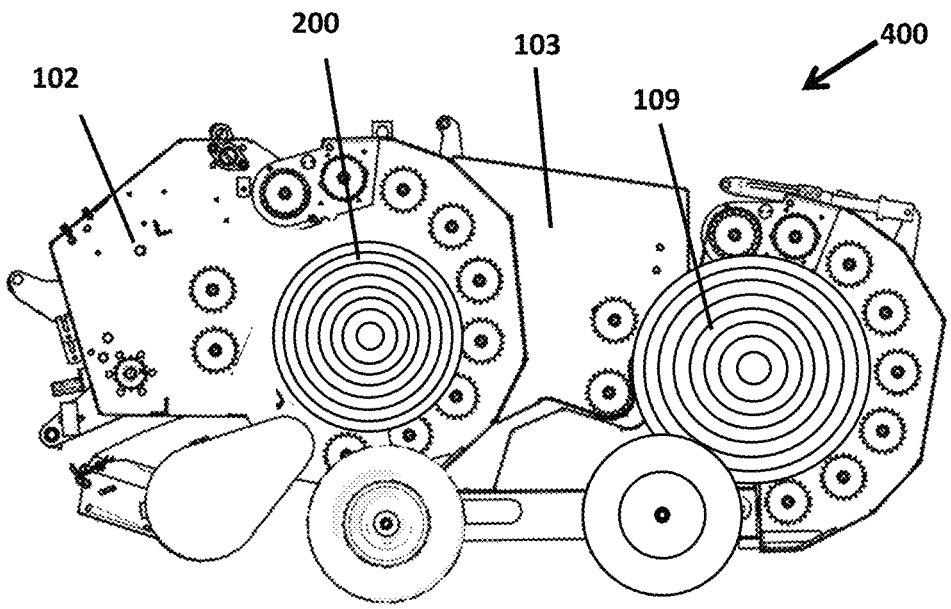
FIG. 27 is a schematic view of the baler of FIG. 21, while the bale is being tied in the tying chamber, according to some embodiments of the present invention.
Figure 28:
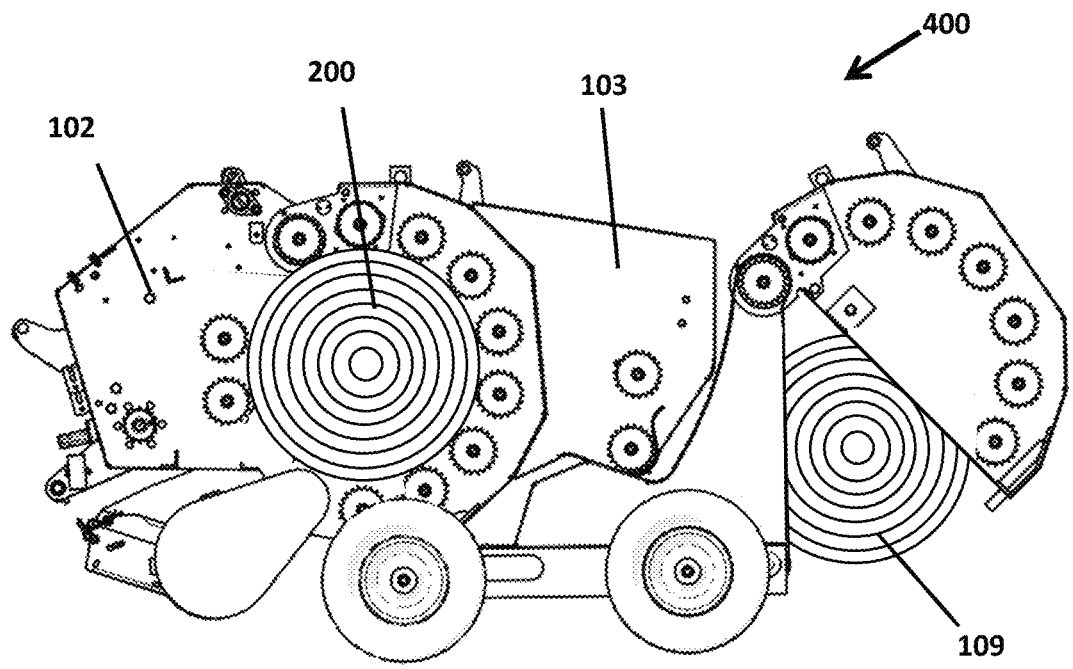
FIG. 28 is a schematic view of the baler of FIG. 21, while the bale is being ejected by opening the gate, according to some embodiments of the present invention.

FIG. 21 is a perspective view of a baler having an upward-swinging gate, according to some embodiments of the present invention. FIG. 21 is a perspective view of a baler having an upward-swinging gate with the movable portion in an open mode, according to some embodiments of the present invention. FIGS. 23 and 24 and perspective views of a baler having an upward-swinging gate when the gate is open, according to some embodiments of the present invention. FIG. 25 is a schematic view of the baler of FIG. 21, during the production of a bale in the baling chamber, according to some embodiments of the present invention. FIG. 26 is a schematic view of the baler of FIG. 21, while the bale is being transferred from the baling half chamber to the tying half chamber, according to some embodiments of the present invention. FIG. 27 is a schematic view of the baler of FIG. 21, while the bale is being tied in the tying chamber, according to some embodiments of the present invention. FIG. 28 is a schematic view of the baler of FIG. 21, while the bale is being ejected by opening the gate, according to some embodiments of the present invention.

The continuous baler 400 is similar to the baler 100 of FIGS. 1-20. In the baler 400 includes a collection unit 101 at the front side of the baler as described above, followed by a fixed baling half chamber 102 as described above, a movable section 103 as described above, and a tying half-chamber which differs than the tying-half chamber described above.

The tying half chamber includes two fourth walls 231 and 232 which are opposing side walls of the tying chamber, and a gate 107. The gate 107 is located behind the fourth walls 231 and 232 and includes two fifth walls 404 and 406 and a plurality of fourth horizontal rollers 402 parallel to each other and to the third horizontal rollers of the movable section 103. The fifth walls may be horizontal walls parallel to each other. The fourth horizontal rollers 402 and disposed along a fourth arcuate vertical path between the two fifth walls 404 and 406. The gate 107 is being hinged via a first hinge 408 to a top section of each of the fourth walls 404 and 406. The tying chamber includes a binding unit is located in the rear half chamber or in the tying half chamber. The binding unit is configured to bind (tie) the bale, as explained above, while the bale is rotated inside the tying chamber.

In the closed mode of the movable section, the tying half chamber and the rear half chamber of the movable section 103 are joined to form a tying chamber in which the third arcuate path of the third rollers 218 and the fourth arcuate path of the fourth rollers 402 form a second circular path, when the gate 107 is closed. The gate is configured for opening by rotating about the first hinge 408 thereof to release the bale out of the baler 400, after the bale is bound.

When the movable section 103 is closed and the gate 107 is closed, the third walls 220 and 222 of the movable section contacts the fourth walls 231 and 232, respectively, while the fourth walls 231 and 232 contact the fifth walls 404 and 406, respectively. In this manner, the tying chamber is closed, and the bale rotates therein and is tied, as explained above. When the tying is finished, the gate 107 opens by rotating (swinging) upward.

In some embodiments of the present invention, the diameter of the second circular path of the tying chamber is smaller than the diameter of the first circular path of the baling chamber. In this manner, the bale is compressed inside the tying chamber.

Initially (FIG. 25), the movable section 103 is in its closed mode. Thus, the baling half chamber 102 and the front half chamber of the movable section 103 are joined together to form a baling chamber. The first arcuate path of the first rollers and the second arcuate path of the second rollers form a first circular path. Thus, the inside of the baling chamber is substantially cylindrical.

As the baler 400 moves forward, the collection unit 101 collects crop and feeds the crop into baling chamber. In the baling chamber the first and second rollers rotate to cause the crop to roll around inside the baling chamber. As more crop is fed into the baling chamber, a cylindrical bale 109 is formed. As the bale 109 increase size and density, the bale pushes against the rollers with increasing force.

In FIG. 26, the bale 109 is fully formed by reaching a desired size and density, and therefore pushes against the rollers with a certain pressure. One or more pressure sensors associated with at least one of the first and/or second rollers detect the pressure and cause an actuator of the movable section 103 to open the movable section by moving the front half chamber away from the baling half chamber, thereby opening the baling chamber. In the example of FIG. 26, the movable section 103 has a hinge mechanism 224 joined to the top roller of the first rollers 204, so that the rotation of the movable section 103 occurs around the top first roller 204 to open the movable section 103. As will be explained later in FIGS. 29 and 30, the movement of the movable section can occur in different manners. When the movable section 103 is in the open mode, the bale 109 is released from the baling half chamber 102 and allowed passage to the tying half chamber 105. If present, the conveyor 108 guides the bale 109 from the bling chamber 102 to the tying half chamber. The conveyor 108 may include a conveyor belt, or a series of floor rollers, or a series of floor rollers which is surrounded by the conveyor belt, as explained above with reference to FIGS. 14, 17, 19a, and 19b.

In FIG. 27, the bale 109 reaches the tying half chamber, and the movable section 103 closes. In this manner, the rear half chamber 210 of the movable section 103 joins the tying half chamber to form a tying chamber. The third arcuate path of the third rollers and the fourth arcuate path of the fourth rollers are opposite sides of a second circular path. The third and fourth rollers rotate causing the bale 109 to rotate about its cylindrical axis. As the bale 109 rotates, the binding unit located in the rear half chamber or in the tying half chamber binds the bale 109, as described above. Optionally, the size of the second circular path of the tying chamber is smaller than the size of the first circular path of the baling chamber. Therefore, as the movable section 103 closes, the bale 109 is compressed inside the tying chamber. In some embodiments of the present invention, while the bale 109 rotates within the tying chamber, no crop (except for the bale itself) is introduced from outside into the tying chamber.

It should be noted that the fourth walls and fifth walls of the tying half chamber ensure that loose portions of dry crop are not lost from the bale during the binding of the bale.

As mentioned above, the baler 400 of the present invention is configured to operate continuously. The collection unit 101 is configured for continuously collecting crop. Even as the bale 109 is being tied, new crop is being collected and a new bale 200 is being formed in the baling chamber, as seen in FIGS. 27 and 28. Therefore, the baler's operation is not stopped at any time.

In FIG. 28, the first bale 109 has been tied, and is released from the baler 100 by opening the gate 107 and guiding the bale 109 via the third rollers of the movable section 103 and/or via the conveyor 108 at the floor of the baler 400. In the meantime, while the movable section 103 is still closed, the second bale 200 is still being formed. Once the first bale is out, the gate 107 is closed, and the process started in FIG. 25 repeats for the second bale 200. In some embodiment of the present invention, the baler 400 includes a proximity sensor associated with the tying chamber, to detect the presence of the bale inside the tying chamber or on the gate, once the gate has been opened. If the proximity sensor detects that the bale is no longer in the tying chamber, the proximity sensor causes the gate 107 to close. In a variant, the proximity sensor includes a weight sensor associated with the floor of the tying half chamber and/or the gate. Any other proximity sensors known in the art may be used to determine the presence or absence of the bale.

In the present invention, a single baling chamber is formed, which has a fixed section (the baling half chamber). The collection unit continuously collects crop and feeds the crop to the baling half chamber. In this manner, there is no need to a complex control of the collection unit, or a need to feed the crop to different baling chambers. Moreover, in the present invention, first and/or second rollers are associate with a pressure sensor, so that once the bale reaches a desired size and density, the associated pressure is detected, and the movable section is opened. In this manner there is no need for complex bale density measurement systems.

It should be noted that expression "half-chamber" does not mean the exact half of a chamber. Rather, the expression refers to a part of a chamber, which when joined to another "half-chamber" forms a closed chamber.

Figure 29:
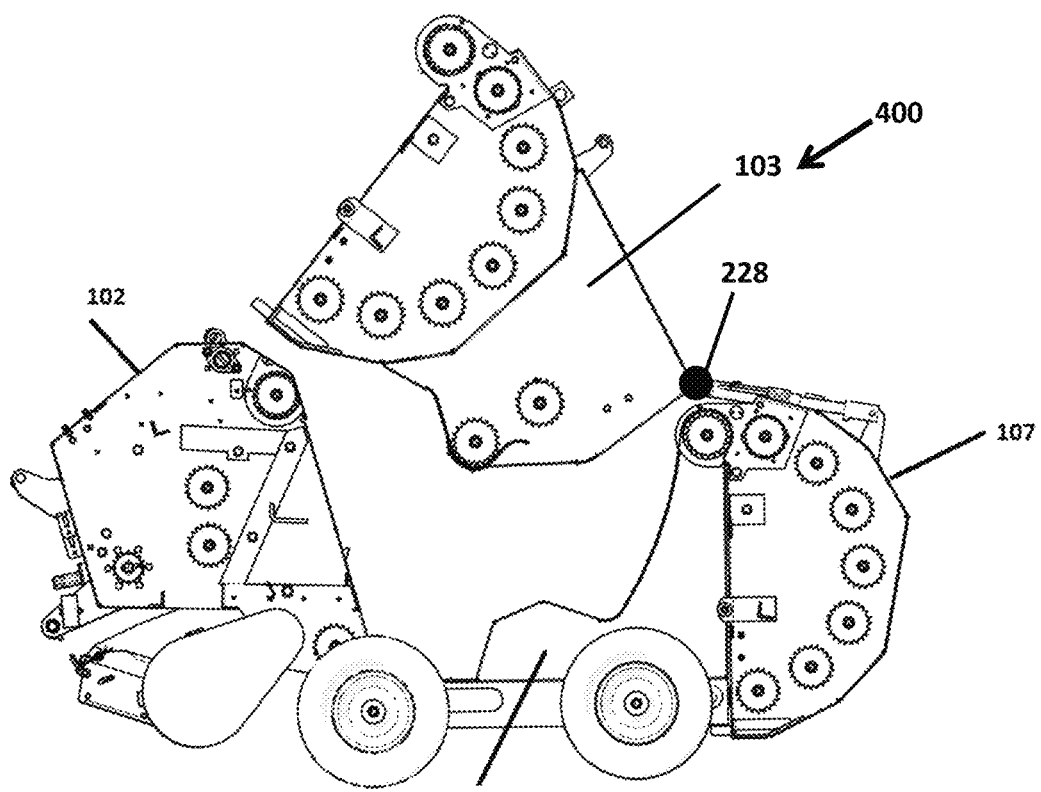
FIG. 29 is an example of the baler of FIG. 21, in which the movable part is hingedly joined to the tying half-chamber, according to some embodiments of the present invention.

FIG. 29 is an example of the baler 400 of FIG. 21, in which the movable part is hingedly joined to the tying half-chamber, according to some embodiments of the present invention.

In a variant, the movable section 103 is hinged to the top of the fourth walls of the tying half chamber 105 via a hinge mechanism 228. The hinge mechanism allows rotation of the movable section 103 around the hinge mechanism 228.

FIG. 29 is an example of the baler of FIG. 21, in which the movable part is joined to an elevator, according to some embodiments of the present invention.

In a variant, the movable section 103 is movable via an elevator. The baler 100 includes an elevator 230 and the movable section 103 is joined to the elevator 230, such that the elevator is configured for raising and lowering the movable section 103. When the movable section 103 is in a raised configuration, it is in the open mode, allowing passage of a bale from the baling half chamber 102 to the tying half chamber 105. When the movable section 103 is in a lowered configuration, it is in a closed mode, such that the baling half chamber 102 and the front half chamber of the movable section 103 are joined to form a baling chamber configured for forming bales from collected crop, while the tying half chamber and the read half chamber of the movable section 103 are joined to form a tying chamber configured for tying and/or wrapping a bale located therein.

Figure 30:
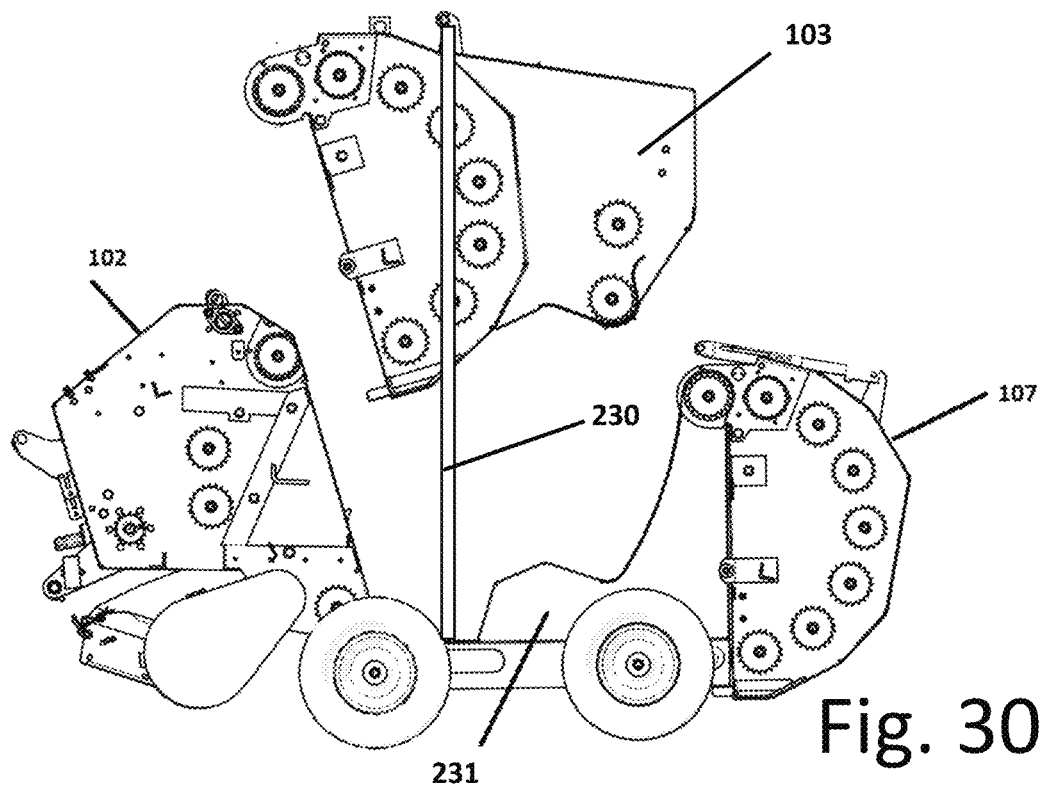
FIG. 30 is an example of the baler of FIG. 21, in which the movable part is joined to an elevator, according to some embodiments of the present invention.
Figure 31:
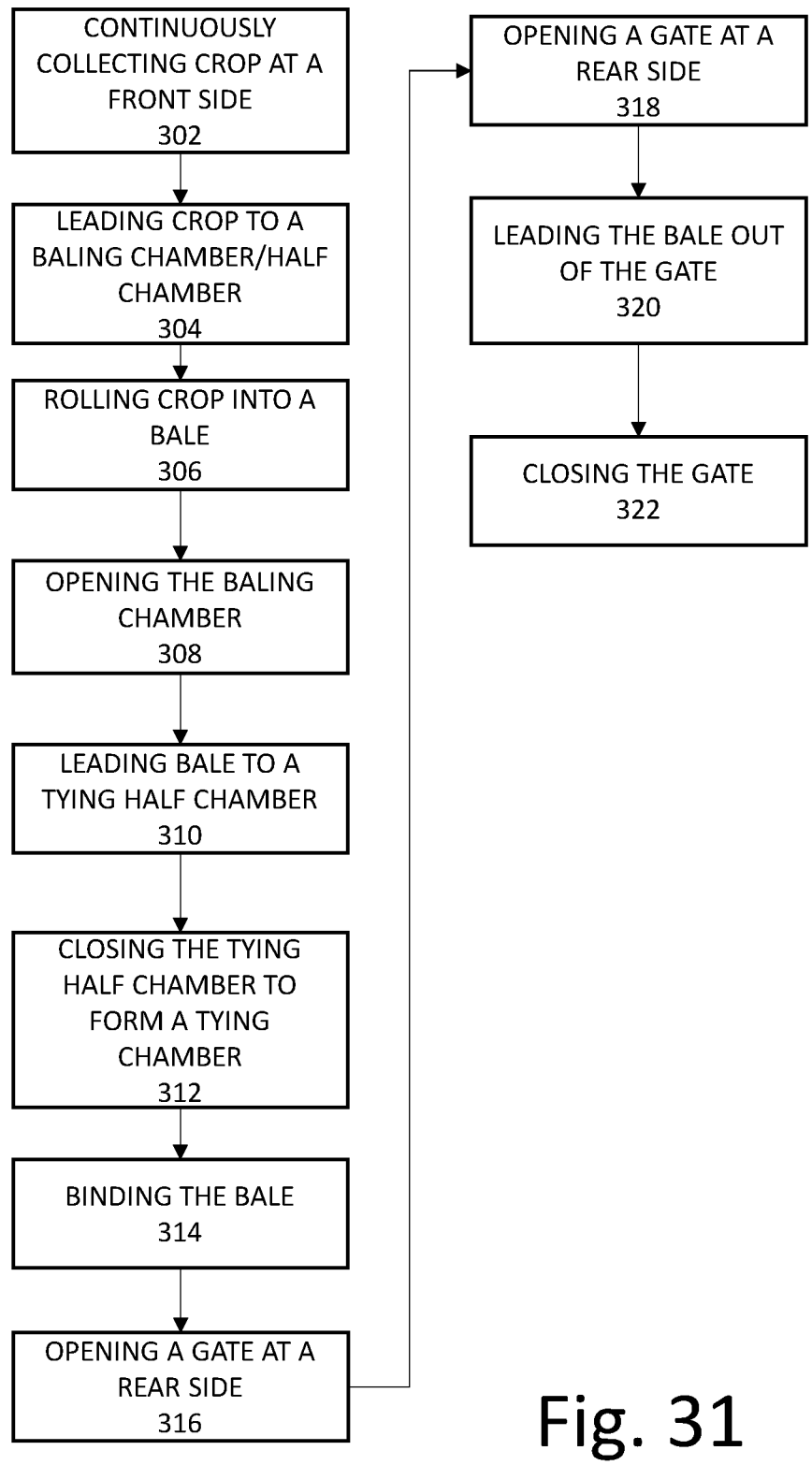
FIG. 31 is a flowchart illustrating a method for baling, according to some embodiments of the present invention.

FIG. 30 is a flowchart 300 illustrating a method for baling using a baler 100 or 400 as described above, according to some embodiments of the present invention.

At 302, crop of is continuously collected from a front side of the baler. At 304, the collected crop is led solely to a baling chamber or a baling half-chamber. It should be noted that the collection of the crop and the leading of the crop to the baling chamber or baling half chamber occurs even during the following steps of the method.

At 306, crop is rolled into a cylindrical bale in the baling chamber, by being rotated by the rollers of the baling chamber. At 308, when the bale has fully formed by reaching a desired size and density, the movable section is opened, thereby opening the baling chamber. The bale is led to a tying half chamber at 310.

At 312, the movable section is closed and a tying chamber is closed. At 314, the bale is rotated in the tying chamber and bound, as described above. It should be noted that no crop beside the bale is introduced into the tying chamber during the rotation of the bale in the tying chamber. The bale has fully formed in the baling chamber prior to being introduced into the tying chamber. In some embodiments of the present invention, the tying chamber is smaller than the baling chamber. Therefore, the bale is compressed while rotating in the tying chamber. At 318, when the binding of the bale is completed, the gate at the rear end of the baling chamber is opened. At 320, the bale is led out of the gate and out of the baler. At 322, the gate is closed.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A continuous baler for forming bales of crop, the baler comprising:
   (i) a collection unit at a front end of the baler, the collection unit being configured for collecting the crop from a ground on which the continuous baler travels;
   (ii) a baling half chamber located behind the collection unit, configured to receive the crop from the collection unit and comprising two first walls and a plurality of first horizontal rollers parallel to each other and disposed between the two first walls along a first arcuate path along a vertical plane;
   (iii) a movable section located aft of the baling half chamber, the movable section comprising a front half chamber on a front side of the movable section and a rear half chamber on a rear side thereof;
       the front half chamber comprising two second walls and a plurality of second horizontal rollers parallel to each other and to the first horizontal rollers, and disposed between the two second walls along a second arcuate path along a vertical plane;
       the rear half chamber comprising two third walls and a plurality of third horizontal rollers parallel to each other, and disposed between the two third walls along a third arcuate path along a vertical plane;
   (iv) a tying half chamber located behind the movable section and comprising:
       two fourth walls which are opposing side walls of the tying chamber; and
       a gate located behind the fourth walls, the gate comprising two fifth walls and a plurality of fourth horizontal rollers parallel to each other and to the third horizontal rollers, and disposed along a fourth arcuate vertical path between the two fifth walls, the gate being hinged via a first hinge to a top section of each of the fourth walls;
   (v) a binding unit located in the rear half chamber or in the tying half chamber;
   wherein:
       the movable section is movable between an open mode and a closed mode thereof;
       in the closed mode of the movable section, the baling half chamber and the front half chamber of the movable section are joined to form a substantially cylindrical baling chamber in which the first arcuate path of the first rollers and the second arcuate path of the second rollers form together a first circular path;
       the baling chamber is configured to rotate the crop received from the collection unit inside the cylindrical baling chamber in order to form a cylindrical bale;
       in the open mode of the movable section, the front half chamber is moved away from the baling half chamber, thereby opening the baling chamber and enabling passage of the bale into the tying half chamber;
       in the closed mode of the movable section, the tying half chamber and the rear half chamber of the movable section are joined to form a tying chamber in which the third arcuate path of the third rollers and the fourth arcuate path of the fourth rollers form a second circular path, when the gate is closed;
       the tying chamber is configured to cause the bale to rotate about the bale's cylindrical axis while activating the binding unit to bind the bale;

the gate is configured for opening by swinging about the first hinge thereof to release the bale out of the baler, after the bale is bound.

2. The continuous baler of claim 1, wherein the second rollers are parallel to the third rollers.

3. The continuous baler of claim 1, wherein the collection unit is joined to the baling half chamber via a second hinge, and is configured to rotate around the second hinge for being selectively lowered to the ground and raised from the ground.

4. The continuous baler of claim 1, wherein the first walls are parallel to each other.

5. The continuous baler of claim 1, wherein the second walls are parallel to each other.

6. The continuous baler of claim 1, wherein the third walls are parallel to each other.

7. The continuous baler of claim 1, wherein the fourth walls are parallel to each other.

8. The continuous baler of claim 1, wherein the movable section is joined to a top of the baling half chamber via a third hinge, and is configured to move between the closed mode and the open mode by rotating about the third hinge.

9. The continuous baler of claim 1, wherein the movable section is joined to a top of the tying half chamber via a fourth hinge, and is configured to move between the closed mode and the open mode by rotating about the fourth hinge.

10. The continuous baler of claim 1, further comprising an elevator, wherein the movable section is joined to the elevator, such that the elevator is configured for raising the movable section to the open mode and for lowering the movable section to the closed mode.

11. The continuous baler of claim 1, comprising a conveyor located between the baling half chamber and the tying half chamber, the conveyor being configured to carry the bale from the baling half chamber to the tying half chamber.

12. The continuous baler of claim 11, wherein a rear section of the conveyor is the floor of the tying half chamber.

13. The continuous baler of claim 1, comprising a pressure sensor associated with at least one of the first rollers and/or at least one of the second rollers, and a first actuator configured for moving the movable section, wherein:
the pressure sensor is configured for sensing a pressure exerted by the bale on the at least one of the first rollers and/or at least one of the second rollers when the movable section is in the closed mode, and for causing the first actuator to move the movable section to the open mode when the pressure reaches a predetermined pressure.

14. The continuous baler of claim 1, wherein the first circular path is larger than the second circular path, such that a closing of the movable section on the bale when the bale is in the tying the chamber is configured to compress the bale in the tying chamber.

15. The continuous baler of claim 1, further comprising a second actuator and a sensing unit associated with the binding mechanism, wherein the sensing unit is configured for detecting an end of a binding of the bale inside the tying chamber and for causing the gate to open in order to eject the bale out of the baler.

16. The continuous baler of claim 1, further comprising a second actuator and a proximity sensor associated with the tying chamber, wherein the proximity sensor is configured for sensing a presence of the bale in the tying chamber and on the gate while the gate is open and for causing the second actuator to close the gate if the presence of the bale is sensed neither in the tying chamber nor on the gate.

17. A method for forming crop bales, the method comprising:
providing a baler;
forming a baling chamber in the baler by joining a front half chamber of a movable section to a fixed baling half chamber;
continuously collecting crop from a front side and leading the crop solely to the fixed baling half chamber;
rolling the crop to form a bale in the baling chamber;
once the bale is fully formed by reaching a desired size and density, opening the baling chamber, by moving the movable section away from the baling half chamber;
leading the bale to a tying half chamber;
forming a tying chamber by closing the movable section in order to join a rear half chamber of the movable section to the tying half chamber;
binding the bale in the tying chamber;
once the bale is bound, opening a gate of the tying half chamber at a rear side of the baler;
leading the bale out of the baler via the gate;
once the bale is out of the baler, closing the gate.

18. The method of claim 17, wherein:
the forming of the tying chamber comprises simultaneously forming the baling chamber;
the binding of the bale in the tying chamber comprises simultaneously forming a second bale in the baling chamber;
the method comprises, after the closing of the gate, opening the baling chamber and leading the second bale to the tying half chamber.

19. The method of claim 18, wherein
the tying chamber is smaller than the baling chamber; and
the forming of the tying chamber comprises compressing the bale in the tying chamber.

20. A continuous baler for forming bales of crop, the baler comprising:
(i) a collection unit at a front end of the baler, the collection unit being configured for collecting the crop from a ground on which the continuous baler travels;
(ii) a baling half chamber located behind the collection unit, configured to receive the crop from the collection unit;
(iii) a movable section located aft of the baling half chamber, the movable section being movable between an open mode and a closed mode thereof and comprising a front half chamber on a front side of the movable section and a rear half chamber on a rear side thereof;
(iv) a tying half chamber located behind the movable section, the tying half chamber comprising a gate at an aft portion thereof; and
(v) a binding unit located in the rear half chamber or in the tying half chamber;
wherein:
in the closed mode of the movable section, the baling half chamber and the front half chamber are joined to form a baling chamber, and the tying half chamber and the rear half chamber are joined to form a tying chamber;
the baling chamber is configured to rotate the crop received from the collection unit inside the baling chamber in order to form a bale;
in the open mode of the movable section, the front half chamber is disposed away from the baling half chamber, thereby forming an opening in the baling chamber and enabling passage of the bale into the tying half chamber;

the tying chamber is configured to cause the bale to rotate while activating the binding unit to bind the bale;

the gate is configured for opening to release the bale out of the baler, after the bale is bound.

* * * * *